United States Patent [19]
Lange

[11] Patent Number: 6,092,141
[45] Date of Patent: Jul. 18, 2000

[54] SELECTIVE DATA READ-AHEAD IN BUS-TO-BUS BRIDGE ARCHITECTURE

[75] Inventor: Ronald Edwin Lange, Glendale, Ariz.

[73] Assignee: VLSI Technology, Inc., San Jose, Calif.

[21] Appl. No.: 09/025,020

[22] Filed: Feb. 17, 1998

Related U.S. Application Data

[63] Continuation-in-part of application No. 08/718,969, Sep. 26, 1996, Pat. No. 5,978,878.

[51] Int. Cl.$^7$ ..................................................... G06F 13/38
[52] U.S. Cl. ........................... 710/129; 710/128; 710/57; 713/400
[58] Field of Search .................................. 710/126–129, 710/101, 9, 3, 57, 130; 713/400

[56] References Cited

U.S. PATENT DOCUMENTS

| | | |
|---|---|---|
| 4,430,724 | 2/1984 | Hamilton et al. . |
| 4,710,916 | 12/1987 | Amstutz et al. .......................... 320/424 |
| 4,751,671 | 6/1988 | Babetski et al. . |
| 5,079,693 | 1/1992 | Miller . |
| 5,522,086 | 5/1996 | Burton et al. . |
| 5,535,340 | 7/1996 | Bell et al. . |
| 5,557,750 | 9/1996 | Moore et al. . |
| 5,564,026 | 10/1996 | Amini et al. . |
| 5,579,530 | 11/1996 | Solomon et al. ........................... 710/35 |
| 5,592,682 | 1/1997 | Chejlava, Jr. et al. . |
| 5,608,876 | 3/1997 | Cohen et al. . |
| 5,621,900 | 4/1997 | Lane et al. . |
| 5,632,021 | 5/1997 | Jennings et al. . |
| 5,659,690 | 8/1997 | Stuber et al. . |
| 5,664,117 | 9/1997 | Shah et al. . |
| 5,664,197 | 9/1997 | Kardach et al. . |
| 5,673,399 | 9/1997 | Guthrie et al. . |
| 5,673,400 | 9/1997 | Kenny . |
| 5,724,529 | 3/1998 | Smith et al. . |
| 5,729,760 | 3/1998 | Poisner . |
| 5,737,579 | 4/1998 | Kimura et al. . |
| 5,768,548 | 6/1998 | Young et al. ............................ 710/129 |
| 5,815,677 | 9/1998 | Goodrum ................................ 710/126 |
| 5,838,932 | 11/1998 | Alzien ..................................... 710/128 |
| 5,872,941 | 2/1999 | Goodrum et al. ....................... 710/128 |
| 5,881,254 | 3/1999 | Corrigan et al. ........................ 710/129 |

OTHER PUBLICATIONS

PCI Local Bus Specification Rev 2.1 Jun. 1, 1995 Chapt 3 pp. 21–33.

"DECchip 21052 PCI–to–PCI Bridge Data Sheet", *Digital Equipment Corporation*, Order Number: EC–QHURA–TE, pp. (i)–A2 (Jun. 1995).

"DMA Support on the 'PCIway'", Version 5.4, pp. 1–16 (Aug. 2, 1995).

"Mobile PC/PCI DMA Arbitration and Protocols MHPG Architecture Functional Architecture Specification", *Intel Corporation*, Revision 2, pp. 1–26 (Mar. 29, 1996).

"PCI Local Bus, PCI to PCI Bridge Architecture Specification", Revision 1.0, pp. (i)–66 (Apr. 5, 1994).

Durda IV, F., "22.3. DMA: What it is and how it works", *FreeBSD Handbook: Assorted technical topics*, (Oct. 18, 1995).

Solomon, G., "Implementing Legacy Audio on the PCI Bus", *Intel Corporation*, Revision 1.01, pp. 1–7 (1996).

*Primary Examiner*—Paul R. Myers

[57] ABSTRACT

A method and arrangement for transferring an indeterminate quantity of data from a target data bus to a requesting data bus. A memory block read command is provided to the target bus by an initiating device coupled to an initiating bus. Successive data segments are repeatedly transferred from the target device into a data buffer which is coupled between the initiating and target buses. The data segments are concurrently transferred from the data buffer to the initiating bus while other data segments are being transferred from the target bus into the data buffer. The transfer is terminated upon receipt of the entire desired data block at the initiating bus, and any read-ahead data remaining in the data buffer after this termination is discarded. The concurrent data transfer is allowed when the memory block read command is not in a delayed completion state, and the command response and requested data are next in the response queue.

16 Claims, 22 Drawing Sheets

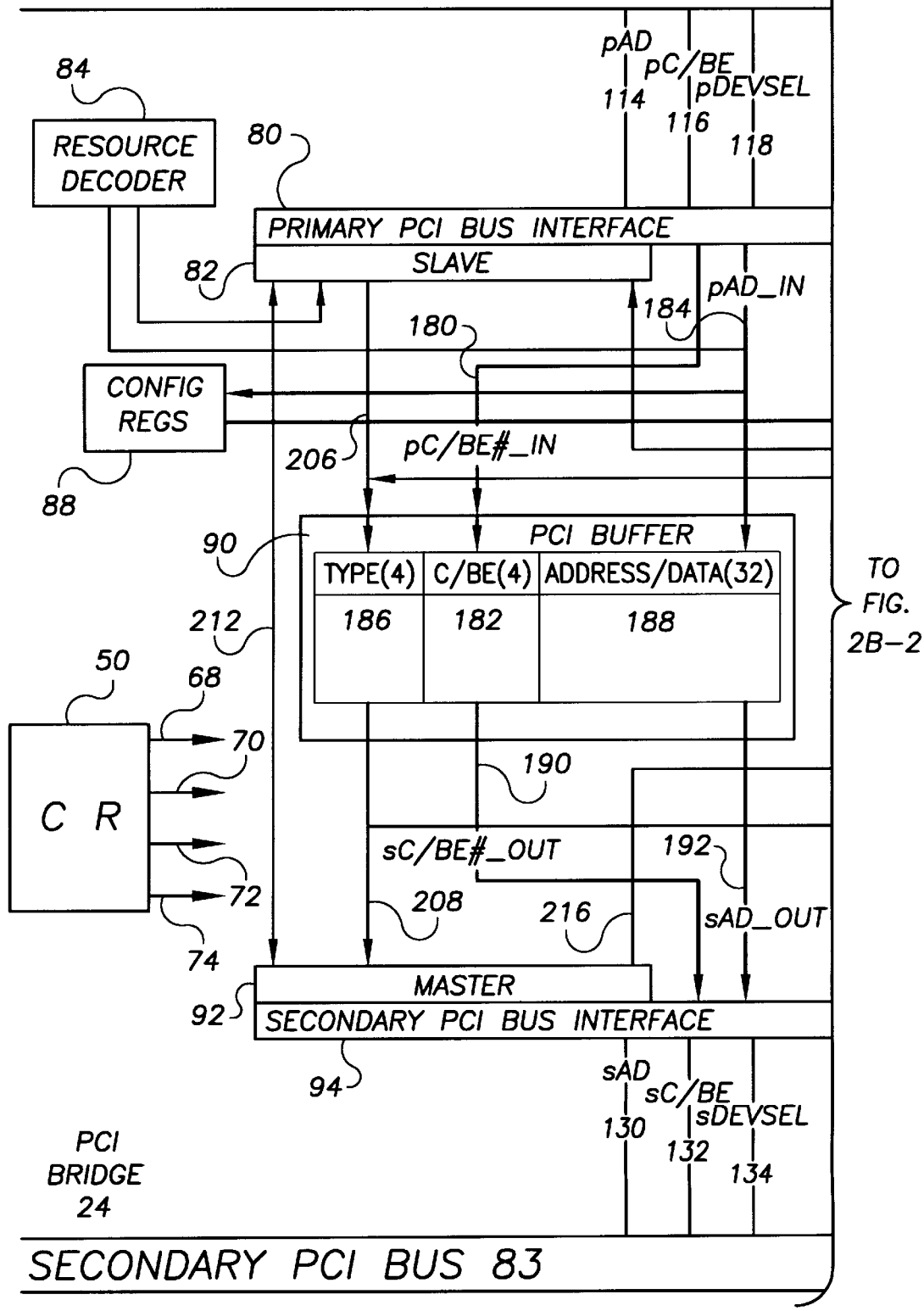

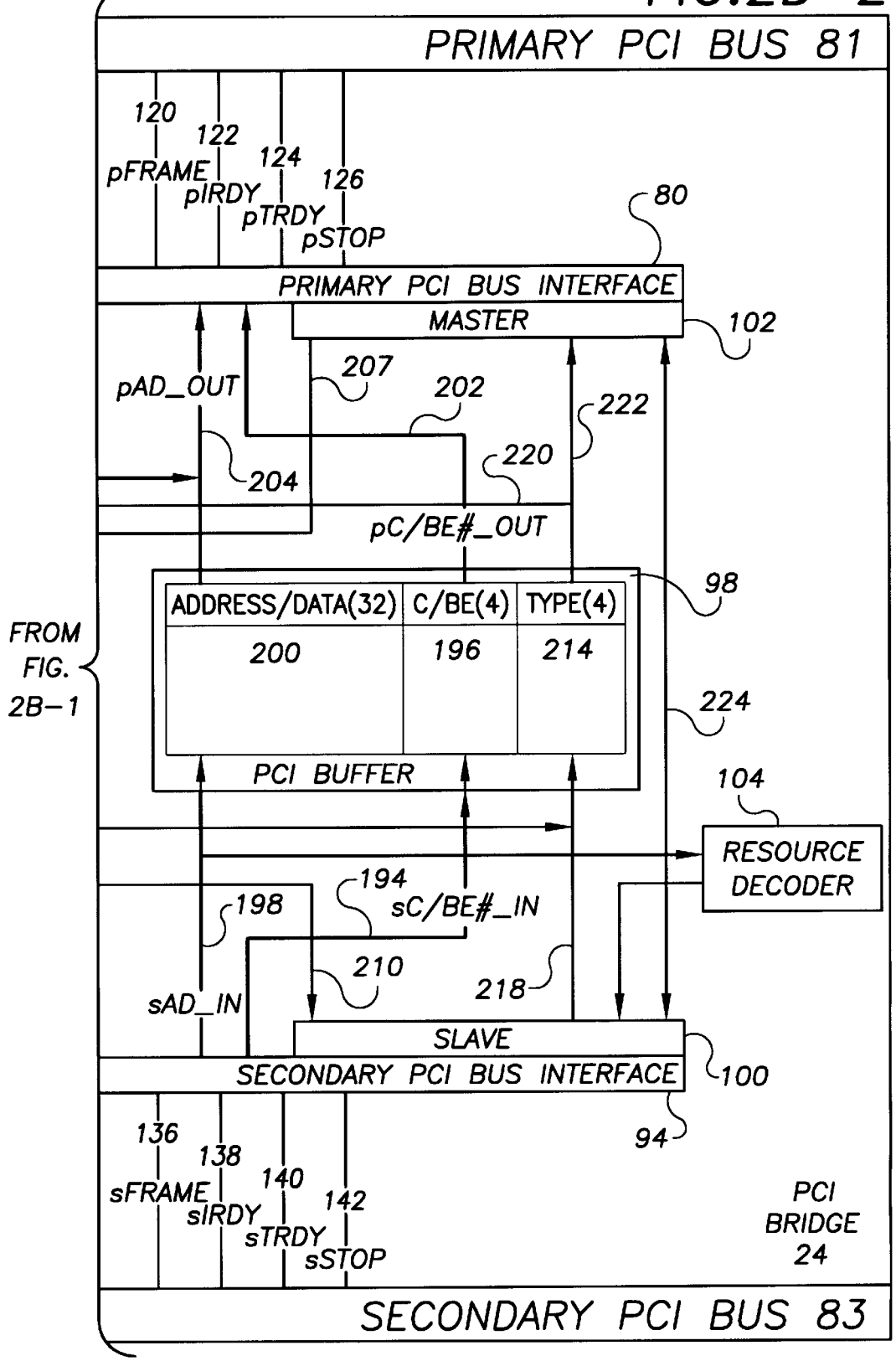

CONFIGURATION WRITE CYCLE

CONFIGURATION READ CYCLE

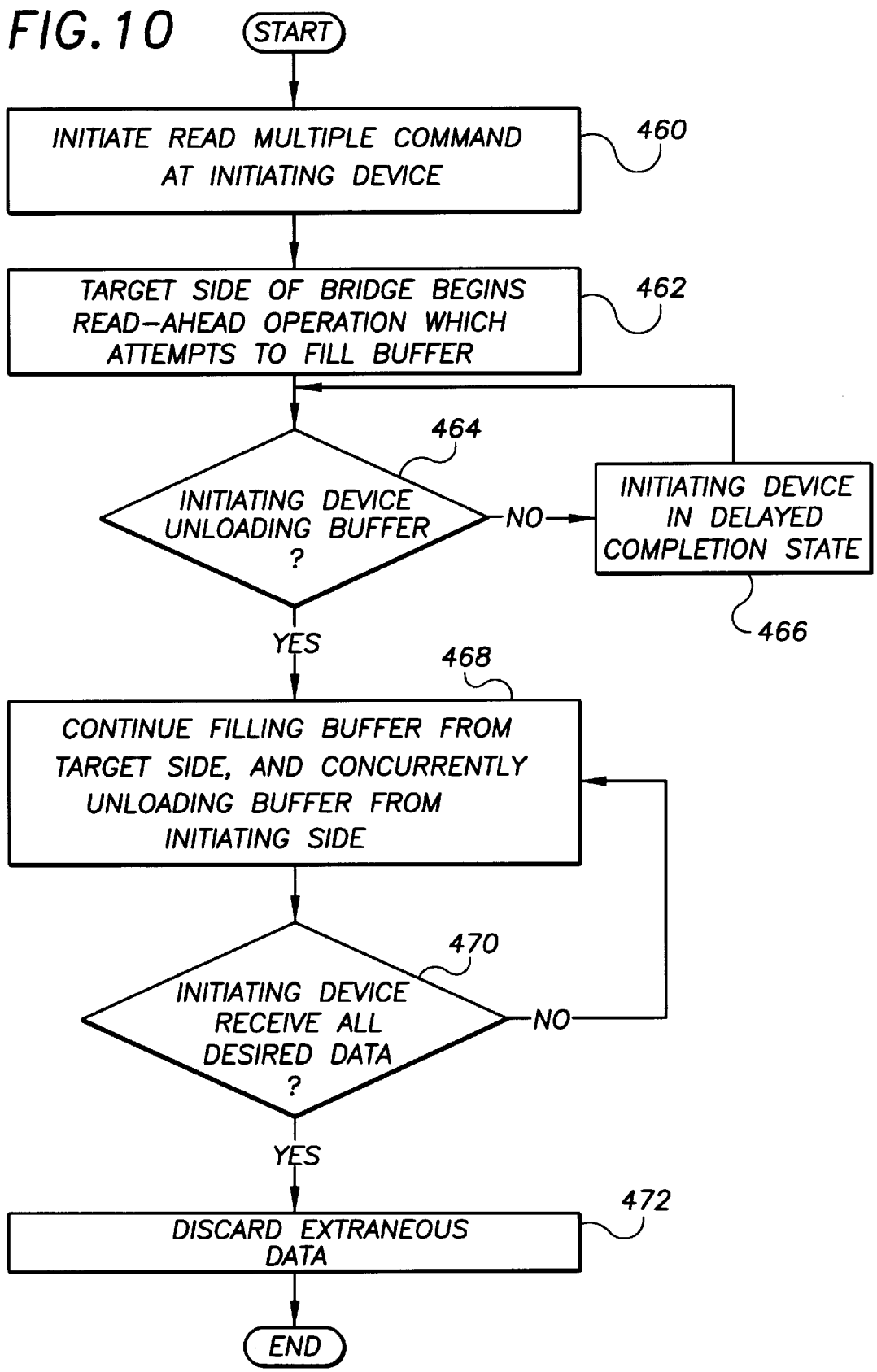

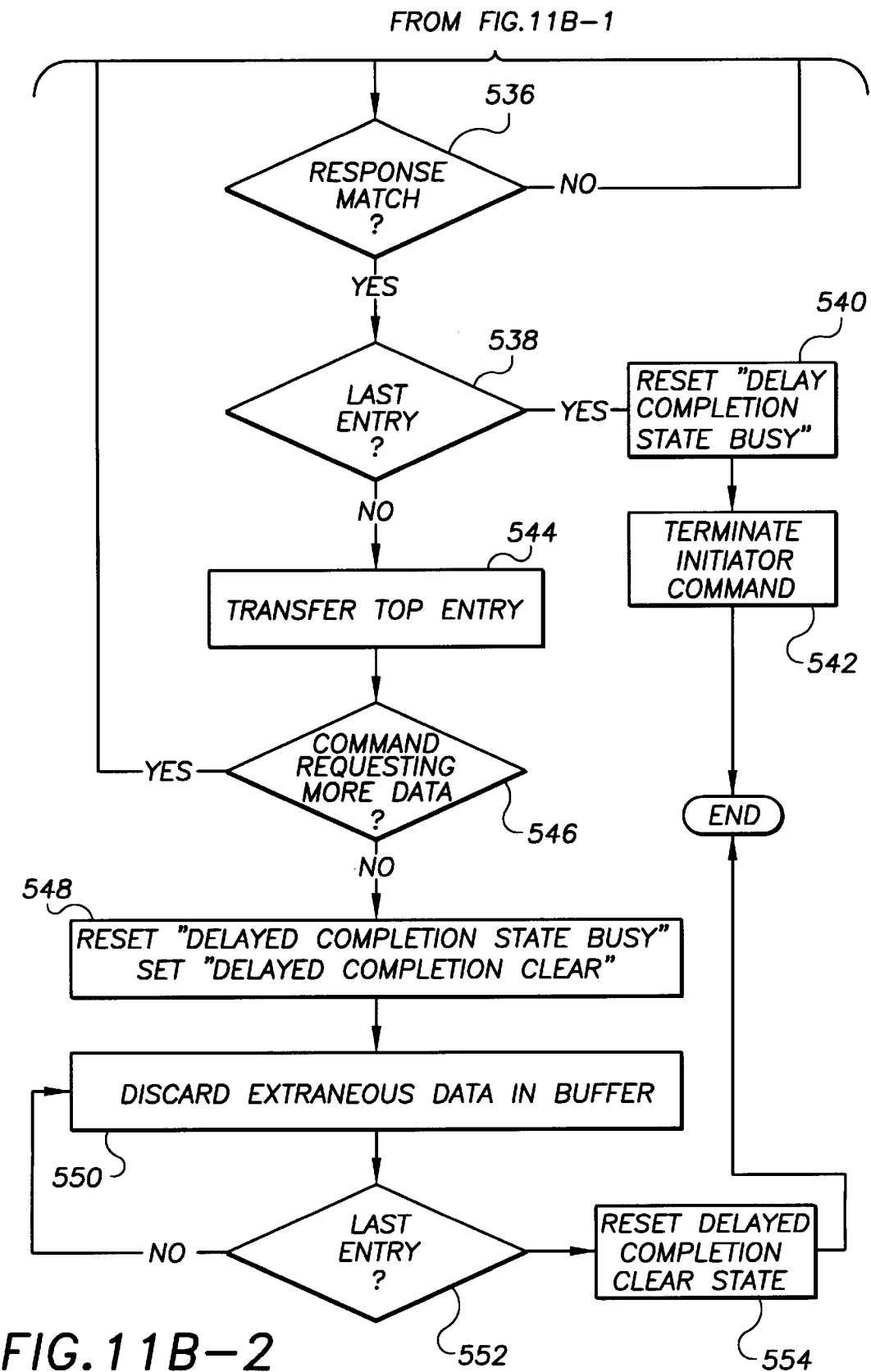

FIG. 15

CACHE LINE SIZE REGISTER

| Config Reg 0Ch | D7 | D6 | D5 | D4 | D3 | D2 | D1 | D0 |
|---|---|---|---|---|---|---|---|---|
| | | | | CACHELINE | | | | |
| POR Value | 0 | 0 | 0 | 0 | 0 | 0 | 0 | 0 |

FIG. 16

CONTROL REGISTER

| Config Reg 40h–42h | D23 | D22 | D21 | D20 | D19 | D18 | D17 | D16 |
|---|---|---|---|---|---|---|---|---|
| | R | CON_DIS | CARB_EN | SARB_EN | EXT_ARB | SCKRN_EN | RBRD_XLT | |
| POR Value | 0 | 0 | 0 | 0 | 0 | 0 | 0 | 0 |
| | D15 | D14 | D13 | D12 | D11 | D10 | D9 | D8 |
| | SYNCH | EN_SRE | BUSLOCK | PFWBRST_EN | MRBRST_EN | MWBRST_EN | DRM | PRM |
| | 0 | 0 | 0 | 1 | 0 | 1 | 0 | 0 |
| | D7 | D6 | D5 | D4 | D3 | D2 | D1 | D0 |
| | SECSUB | SSUB-TIME | RST2TRI# | DMA_RD AHD# | PRISUB | PSUB-TIME | SERR_CTL | PERR_CTL |
| | 0 | 0 | 1 | 0 | 0 | 0 | 0 | 0 |

SELECTIVE DATA READ-AHEAD IN BUS-TO-BUS BRIDGE ARCHITECTURE

CROSS REFERENCE TO RELATED APPLICATIONS

This application is a Continuation-In-Part application of, and claims priority from, U.S. patent application Ser. No. 08/718,969 entitled "Selective Latency Reduction in Bridge Circuit Between Two Busses" filed on Sep. 26, 1996, and issued as U.S. Pat. No. 5,978,878 on Nov. 2, 1999 which is assigned to the assignee of the instant application, the contents of which are incorporated herein by reference.

FIELD OF THE INVENTION

The present invention relates generally to data transfers via computer bussing architectures. More particularly, this invention relates to a system and method for controlling and executing the direct transfer of an indeterminate quantity of data between a targeted data bus to a requesting data bus.

BACKGROUND OF THE INVENTION

The Peripheral Component Interface (PCI) bus was developed as a high speed I/O bus alternative to the Industry Standard Architecture (ISA) I/O bus commonly used in IBM PC-compatible personal computer systems. The I/O bus links peripherals, including disk drives, video screens, network cards, to a host bus, where the host bus links the central processor unit and the memory, usually random access memory. Due to its higher information handling rate than the ISA bus, the PCI bus is particularly useful in situations where there are large amounts of data to be transferred, such as Super VGA images and graphically based operating systems like WINDOWS®. The PCI bus has a clock rate of 33 MHz and uses a 32 bit word, in contrast to the 16 bit word of the ISA which operates at 8 MHz. Thus, the data handling capabilities of the PCI bus are significantly improved over the ISA bus.

As computer applications become increasingly more sophisticated, and video screens increase in resolution, the data throughput of computers continues to increase. It is therefore important to accommodate this increase in the context of data throughput in I/O buses which interface with computers.

One area of concern in limiting the data throughput of a PCI bus system is the bridge spanning between two PCI buses. Commonly, a PCI-to-PCI bridge includes a first-in-first-out register which receives information from a first PCI bus and passes the information over to the second PCI bus. There are various handshake, verification and data transfer procedures which all take time to complete, and which slow down the transfer of data from one bridge to another.

Throughput across bussing architectures becomes particularly important where large blocks of data are to be transferred to a requesting device from a device targeted for supplying the data. Furthermore, it would be advantageous to provide the ability for commands to be retried or reissued at the request of the target device and the initiating device when necessary. Therefore, it would be desirable for a system to provide for the direct transfer of blocks of data across computer buses while taking into account the desirability of implementing initiating device reissue commands and target device retry commands. The present invention provides an arrangement which overcomes the aforementioned drawbacks, and offers other advantages over the prior art.

SUMMARY OF THE INVENTION

The present invention is directed to a system and method for controlling and executing the direct transfer of an indeterminate quantity of data between a targeted data bus to a requesting data bus.

In accordance with one embodiment of the invention, the present invention provides a method for transferring stored data blocks having a plurality of data segments from a target bus to an initiating bus. A memory block read command is provided to the target bus by an initiating device coupled to the initiating bus. Successive data segments are repeatedly transferred, beginning at the starting address of the desired data block, from the target device on the target bus into a data buffer which is coupled between the initiating and target buses. The data segments are concurrently transferred from the data buffer to the initiating bus while other successive data segments are being transferred from the target bus into the data buffer. The transfer is terminated upon receipt of the entire desired data block at the initiating bus, and any read-ahead data remaining in the data buffer after this termination is discarded.

In accordance with another embodiment of the invention, it is determined whether the memory block read command is in a delayed completion state, and whether the command response and requested data are available. If they are available, the data segments can then be transferred concurrently and directly between the target and initiating buses.

In accordance with yet another embodiment of the invention, a method for transferring stored data blocks having a plurality of data words from a target bus to an initiating bus is disclosed. A memory block read command is issued from an originating device coupled to the initiating bus to a target device coupled to the target bus. Data words from the target device are transferred into a data buffer coupled between the originating and target buses upon receipt of the memory block read command at the target device. The data buffer is monitored during the transfer of the data words to determine whether the data buffer has available data buffer locations, and if not, the transfer is discontinued. Those commands which were terminated are then retried in order to transfer the remaining data words of the data block that had not been transferred upon termination.

In accordance with still another embodiment of the invention, a system for transferring information between an initiating device coupled to an initiating bus and a target device coupled to a target bus is provided. A command buffer is coupled between the initiating and target buses to queue memory block read commands issued by the initiating device. A response buffer is coupled between the initiating and target buses to queue responses to the memory block read commands, wherein the responses include the information requested by the initiating device. A comparator is coupled to the command buffer and the response buffer to enable the information to be transferred between the target bus and the initiating bus via the response buffer upon determining that a command response at the top of the response buffer queue corresponds to the memory block read command which is live in the command buffer.

The above summary of the present invention is not intended to describe each illustrated embodiment or implementation of the present invention. This is the purpose of the figures and the associated discussion which follows.

BRIEF DESCRIPTION OF THE DRAWINGS

Other aspects and advantages of the present invention will become apparent upon reading the following detailed description and upon reference to the drawings in which:

FIG. 2B illustrates the data transfer portion of the PCI-to-PCI bridge chip in a block form diagram, according to the present invention;

FIG. 10 is a flow diagram illustrating one embodiment of a multiple memory read operation of an indeterminate number of data bytes across a bus bridge in accordance with the present invention;

FIG. 11, including

FIG. 15 is an example of a cache line size register of the configuration register; and FIG. 16 illustrates a control register which includes the retried burst read translation locations.

Figure 1:
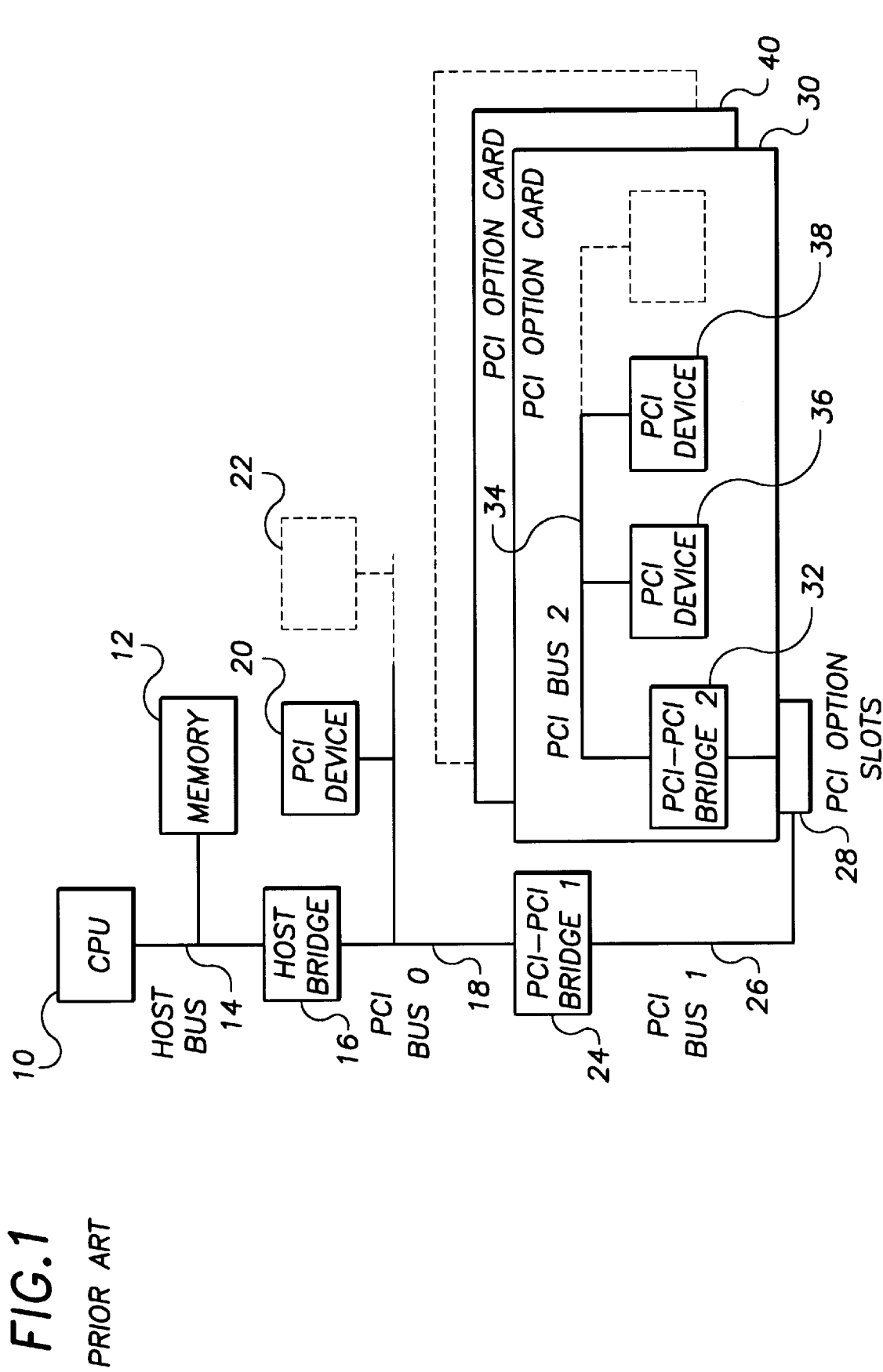
FIG. 1 illustrates a computer-communication arrangement for a PCI bus network including a PCI-PCI bridge constructed in accordance with the present invention but showing only generic blocks known in the prior art.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE ILLUSTRATED EMBODIMENTS

The present invention is believed to have application in interfacing a variety of different types of data buses. The present invention has been found to be particularly helpful in reducing the data transfer time over a bridge circuit interfacing two PCI data buses. While the present invention may have many more uses, it is in this PCI context that the present invention is discussed.

Turning now to the drawings, FIG. 1 illustrates a PCI— PCI bridge 24, constructed in accordance with the present invention, in a conventional architecture for information transfer between a CPU and several PCI-communicating peripheral devices 20, 22, 36 and 38, such as disk drives, monitors, keyboards, and other I/O devices in a personal computer environment. A central processing unit (CPU) 10, e.g., an Intel-based 80486 or Pentium-type microprocessor chip, is connected to memory 12, such as random access memory (RAM), via a host bus 14. A host bridge 16 connects the host bus 14 to a first PCI bus 18. The first PCI bus 18 is connected to a first PCI device 20 and, via a first PCI bridge 24, to the second PCI bus 26. The second PCI bus 26 is connected to PCI option slots 28 into which a first PCI option card 30 is inserted. PCI option card 30 contains a second PCI bridge 32 which allows interaction between the second PCI bus 26 and a third PCI bus 34. The third PCI bus 34 supports other PCI devices 36 and 38. Additional PCI option cards 40 may also be inserted in the PCI option slots 28 for connecting additional PCI devices to the CPU 10.

The host bus 14, connecting the CPU 10 and the RAM 12 operates at relatively high data transfer rates, for fast information transfer between the CPU 10 and the RAM 12. The host bridge 16 connecting other devices to the CPU 10 operates at lower speeds. The first PCI bridge 24 permits the optional extension of the PCI network, so that additional PCI devices may be connected to the CPU 10. The first PCI bridge 24 is required to transfer data according to PCI standards, typically 32 bit data words at 33 MHz clock rates. To maintain high throughput, it is important that the PCI bridges 24 and 32 handle data transfers with a large bandwidth. Reduction of bridge latency time during data transfer is therefore desirable in reducing data transfer delays and increasing throughput.

Figure 2A:
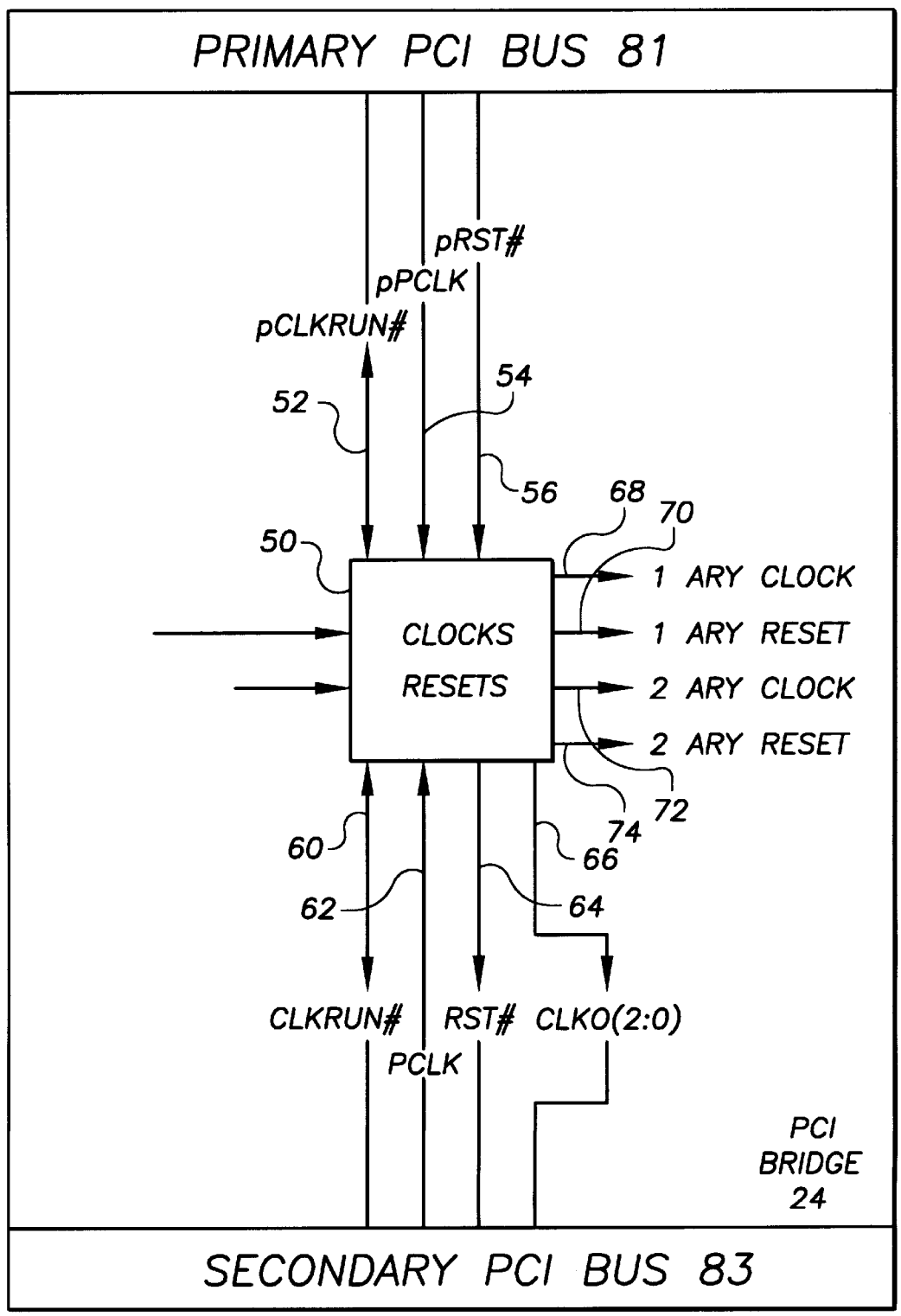
FIG. 2A illustrates the clocks and reset portion of the PCI-to-PCI bridge chip, according to the present invention.

FIGS. 2A and 2B generally illustrate the architecture of the PCI-to-PCI bridge 24, which is configured to provide synchronization between buses and handle data transfer. Synchronization between buses is provided by a conventional clocks and resets (CR) circuit 50, illustrated in FIG. 2A. The CR circuit 50 receives as inputs a pCLKRUN# signal 52 from the primary, or initiating, PCI bus 81, a primary bridge clock signal PPCLK 54, and primary clock reset signal pRST# 56. On the secondary, or target, side of the chip the CR circuit 50 receives a clock run signal sCLKRUN# 60, a secondary clock signal sPCLK 62, and directs a secondary reset signal sRST# 64 and a clock out signal CLKO 66 out to the secondary PCI bus 83. The CR circuit 50 also directs a primary clock signal 68, a primary reset signal 70, a secondary clock signal 72, and secondary reset signal 74 to the data handling portion of the bridge 28.

The CR circuit 50 allows the PCI bridge chip to operate in three different clock modes. In the first clock mode, the primary clock PPCLK 54 and the secondary clock SPCLK 62 are asynchronous clocks. The PCI bridge chip supports transfer between asynchronously driven PCI buses. In the second clock mode, the clocks of the primary PCI bus and the secondary PCI bus are synchronous, with a limited skew. In the third clock mode, the primary clock signal PPCLK 54 is redriven through the CR chip 50 as the CLKO signal 66. The CLKO signal 66 has two bits, one of which is redirected back into the CR block 50 in sPCLK 62 as the secondary clock input, and the other is used as a secondary clock signal for driving the secondary PCI bus 83. In the third clock mode, there may be a large, but known skew between the clock signals applied to the primary and secondary buses. The reduction in the latency of data transfer described hereinbelow is particularly advantageous when using the latter two applications where there is a known skew between clocks of the primary and secondary PCI buses.

The data transfer portion of the bridge 24, illustrated in FIG. 2B, includes a primary PCI bus interface 80 which is the interface between the bridge 28 and the primary, or initiating, PCI bus 81. The primary PCI bus interface 80 receives and transmits several input and output signals from and to the primary PCI bus 81 during the transfer of digital information from the primary PCI bus 81 to the secondary PCI bus 83. According to standard PCI protocol, the primary PCI bus interface 80 has an associated primary PCI slave 82. The primary PCI slave 82 is responsible for forwarding cycles from the primary bus to the primary-secondary (P-S) PCI buffer 90 and responds to address decode hits from the resource decoder 84.

Included in the input and output signals from the primary PCI bus 81 to the primary PCI bus interface 80 are pAD 114, which includes digital address and data information to be transferred, preferably 32 bits, pC/BE 116 which is the command and byte enable data to be transferred across the bridge, preferably 4 bits, PDEVSEL 118, which is the PCI device select signal, pFRAME 120 which is the initiation signal for data transfer, pIRDY 122 which is an interrupt ready signal indicating that command transfer is ready, pTRDY 124 which is a transfer ready signal indicating that data transfer is ready, and pSTOP 126 which is a stop signal for halting the data transfer process.

In a similar manner, the secondary side of the bridge 24 has several inputs and outputs to the secondary bridge. These include sAD 130, which includes the address and data information be transferred, sC/BE 132, which includes the command and byte enable data to be transferred across the bridge, sDEVSEL 134, which includes the PCI device select signal, sFRAME 136 which is the initiation signal for data transfer, sIRDY 138 which is an interrupt ready signal indicating that command transfer is ready, sTRDY 140 which is a transfer ready signal indicating that data transfer is ready, and sSTOP 142 which is a stop signal for halting the data transfer process.

Figures 1, 3:
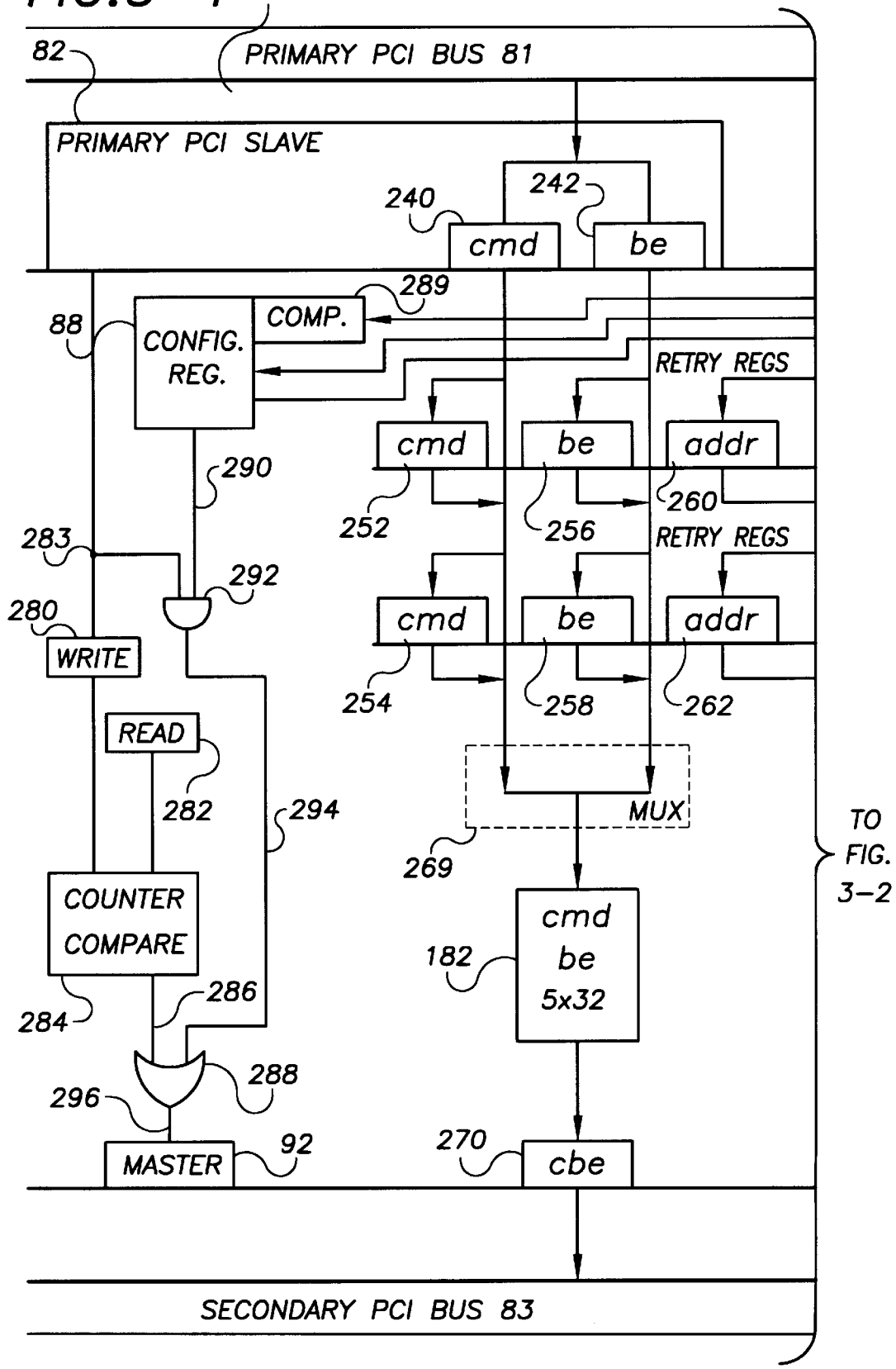
FIG. 3 illustrates specific configuration and data transfer architecture for the PCI-to-PCI bridge chip, according to the present invention.
Figures 2, 3:
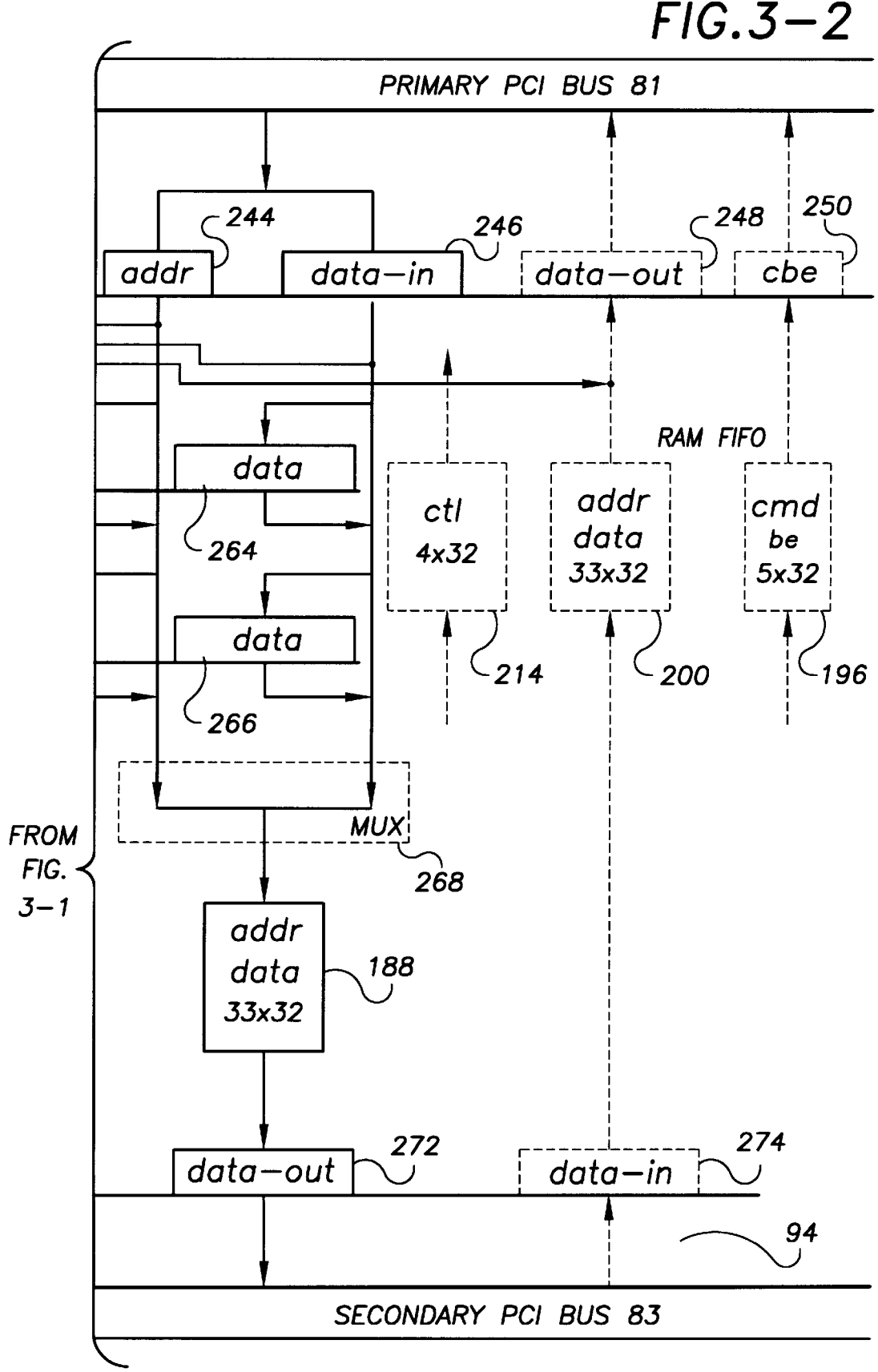

Digital information flows along three paths which are addressed below. In the simplified flow illustrated from the primary PCI bus interface 80 to the secondary PCI bus interface 94, the command and byte enable data, pC/BE#_in 180 is transferred from the primary PCI bus interface 80 to the C/BE buffer 182 in the P-S PCI buffer 90. Address and data information, pAD_in 184 is passed to the address/data buffer 188 in the P-S PCI buffer 90. FIG. 3, discussed hereinbelow, illustrates the flow path for information from the primary PCI bus 81 in greater detail, including buffers and multiplexers which receive the information prior to transfer into the P-S PCI buffer 90. Command/byte enable and address/data information are transferred out of the P-S PCI buffer 90 as sC/BE#_out 190 and sAD_out 192, respectively, to the secondary PCI bus interface 94.

In a symmetrical manner, command, byte enable, address, and data information are transferred from the secondary PCI bus interface 94 through the secondary to primary (S-P) PCI buffer 98 to the primary PCI bus interface 80. Command and byte enable information are transferred from the secondary PCI bus interface 94 as sC/BE#_in 194 to the C/BE buffer 196 in the S-P PCI buffer 98. Address and data information are transferred from the secondary PCI bus interface 94 as sAD_in 198 to the address/data buffer 200 in the S-P PCI buffer 98. The command and byte enable information is transferred out of the S-P PCI buffer 98 to the primary PCI bus interface 80 as pC/BE_out 202 and the address and data information are transferred to the primary PCI bus interface 80 as pAD_out.

A third data path is illustrated to be from pAD_in 184 to the programmable configuration register 88 and from the programmable configuration register 88 to pAD_out 204. This third path is used for transferring configuration data from the CPU 10 to the programmable configuration register 88 so as to configure the bridge 28 for handling digital information in one of a number of preselectable ways. The CPU 10 may also read the current configuration of the programmable configuration register 88.

In addition to the above data flow paths, there are other control data paths for controlling the PCI bridge 24. Control information is transferred from the primary slave 82 along path 206 and from the primary master 102 along path 207 to the P-S PCI buffer 90, and is stored in a control buffer 186 from where it is transferred to both the secondary master 92 and the secondary slave 100 along paths 208 and 210. Additionally, the primary PCI slave 82 communicates directly with the secondary PCI master 92 through path 212.

In a symmetrical manner, the secondary PCI master 92 and the secondary PCI slave 100 transfer control data to the control buffer 214 in the S-P PCI buffer 98 along paths 216 and 218, respectively. Control data is transferred out of the S-P PCI buffer 98 to the primary PCI slave 82 and the primary PCI master 102 along paths 220 and 222, respectively. In addition, the primary PCI master 102 communicates directly with the secondary PCI slave 100 along path 224.

FIG. 3 illustrates the architecture of one side of the PCI bridge chip in greater detail, showing the circuitry used for transferring information from the primary PCI bus 81 through the primary PCI bus interface 80 to the secondary PCI bus interface 94, for transferring to the secondary PCI bus 83. The primary PCI bus interface 80 includes registers to receive command 240, byte enable 242, address 244 and data-in 246 information from the primary PCI bus 81 for transferring to the P-S PCI buffer 90. The address register 244 and the data-in register 246 are both fed by pAD 114 from the primary PCI bus 81, but only address information is registered in the address register 244 and only data information is registered in the data register 246. Likewise, the command and byte enable registers 240 and 242 are fed by pC/BE 116 from the primary PCI bus 81, but only command information is registered in the command register 240 and only byte enable information is registered in the byte enable register 242. The primary PCI bus interface 80 also includes registers for data out 248 and command and byte enable 250 information for transferring information received from the S-P PCI buffer 98 to the primary PCI bus 81. There are two layers of retry registers for command 252 and 254, byte enable 256 and 258, address 260 and 262, and data 264 and 266 information. A major purpose for the retry registers 252–266 is to assist in enabling the target PCI bus to retry a read from the P-S PCI buffer 90 in the case of a read timeout.

The 32-bit address word from the address retry register 262 and the 32-bit data-in word from the data retry register 266 are multiplexed in the multiplexer 268 before being transferred to the 32-bit address/data buffer 188 in the P-S PCI buffer 90. Likewise, the command and byte enable words from the command and byte enable retry registers 254 and 258 are multiplexed in multiplexer 269 before being transferred into the command/byte enable buffer 182 of the P-S PCI buffer 90.

The output from the C/BE buffer 182 is transferred to the secondary C/BE register 270 on the secondary bus interface 94. The address and data information are passed from the address/data buffer 188 to the data-out register 272 on the target bus interface.

Another important aspect of the invention is that the bridge 24 is provided with two, symmetrical, information transfer circuits, to enable information transfer in both directions between the primary and secondary buses. An advantage of this is that identical circuits may be used for information transfer in either direction, and the need to design and implement different circuits for each direction may be avoided. There is a set of two banks of retry registers between the secondary interface and the S-P PCI buffer 98, equivalent to retry registers 252 to 266, and a multiplexer for multiplexing data and address information received from the secondary PCI interface 94 and for transferring the multiplexed information into the address and data buffer 200. The secondary PCI bus interface 94 is provided with a data-in buffer 274 for transferring data from the secondary PCI bus to the address buffer 200.

The programmable configuration register 88 is connected to both the address and data-in buffers 244 and 246. A compare circuit 289 in the programmable configuration register compares incoming address information from the address register 244 with the address of the configuration register. When the incoming address information matches the address of the programmable configuration register 88, the programmable configuration register 88 accepts subsequent data from the data-in buffer 246 as new configuration data so as to reconfigure the programmable configuration register 88.

Latency reduction circuitry is included in the bridge 24 for reducing the time taken to transfer digital information from the primary PCI bus 81 to the secondary PCI bus 83. Latency reduction is described further in connection with FIG. 3.

In conventional operation, the secondary PCI bus interface senses that there is information for transfer in the P-S PCI buffer 90 by comparing the primary-to-secondary (P-S) write counter 280 with the primary-to-secondary (P-S) read counter 282. If there is no information in the P-S PCI buffer 90, then the P-S write counter 280 and the P-S read counter 282 both point to the same address in the P-S PCI buffer 90. When information is written to the P-S PCI buffer 90 from the primary PCI bus, the primary PCI slave 82 increments the P-S write counter 280 to point to the newly written information using the write increment signal 283. On the clock cycle following the increment of the P-S write counter 280, the counter compare circuit 284 compares the P-S write counter 280 with the P-S PCI buffer read buffer 282. Upon detecting a difference, a buffer busy signal 286 is generated by the counter compare circuit 284, indicating that there is data ready to be read in the P-S PCI buffer 90. Conventionally, the buffer busy signal is applied directly to the secondary PCI master 92, which then initiates reading information from the P-S PCI buffer 90 to the secondary PCI bus. In the illustrated embodiment, the buffer busy signal 286 from the counter compare circuit 284 is applied as an input to an OR gate 288.

Another important aspect of the illustrated embodiment of FIG. 3 concerns an output of the programmable configuration register 88 referred to as the by-pass enable signal 290. The by-pass enable signal 290 and the write increment signal 283 form the inputs of an AND circuit 292. The output of the AND circuit 292 is a by-pass signal 294. The by-pass signal 294 is a second input to the OR circuit 288. The output from the OR circuit 288 is the data ready signal 296, which is applied to the secondary PCT master 92 and indicates that there is information ready in the P-S PCI buffer for transferring to the secondary PCI bus 83. The data ready signal 296 is logically high when the counter compare circuit 284 calculates that the buffer is busy, or when the by-pass enable signal 290 and the write increment signal 283 are high. The by-pass enable signal 290 is set high at start-up configuration using the programmable configuration register 88 before information is written to the P-S PCI buffer 90, and the write increment signal 283 is set on the clock cycle following the clock cycle where the information is written. Thus, the by-pass signal 294 is generated during the same clock cycle the data is written into the P-S PCI buffer 90, whereas the counter compare circuit 284 generates the buffer busy signal 286 on the clock cycle following the clock cycle when information is written into the P-S PCI buffer. The secondary PCI master 92 is, therefore, enabled to read information from the P-S PCI buffer 90 before the counter compare circuit 284 has established that there is information in the P-S PCI buffer 90 ready to be written to the secondary PCI bus. The secondary PCI master 92 may read information from the P-S PCI buffer 90 in the same clock cycle as information is written in, if there is sufficient time for the write and read operations. The requirements on the timing of the process are discussed hereinbelow. Since the bridge 28 is symmetrical, by-pass circuitry also exists for the secondary to primary data flow path, as is described hereinbelow.

Figures 1, 4:
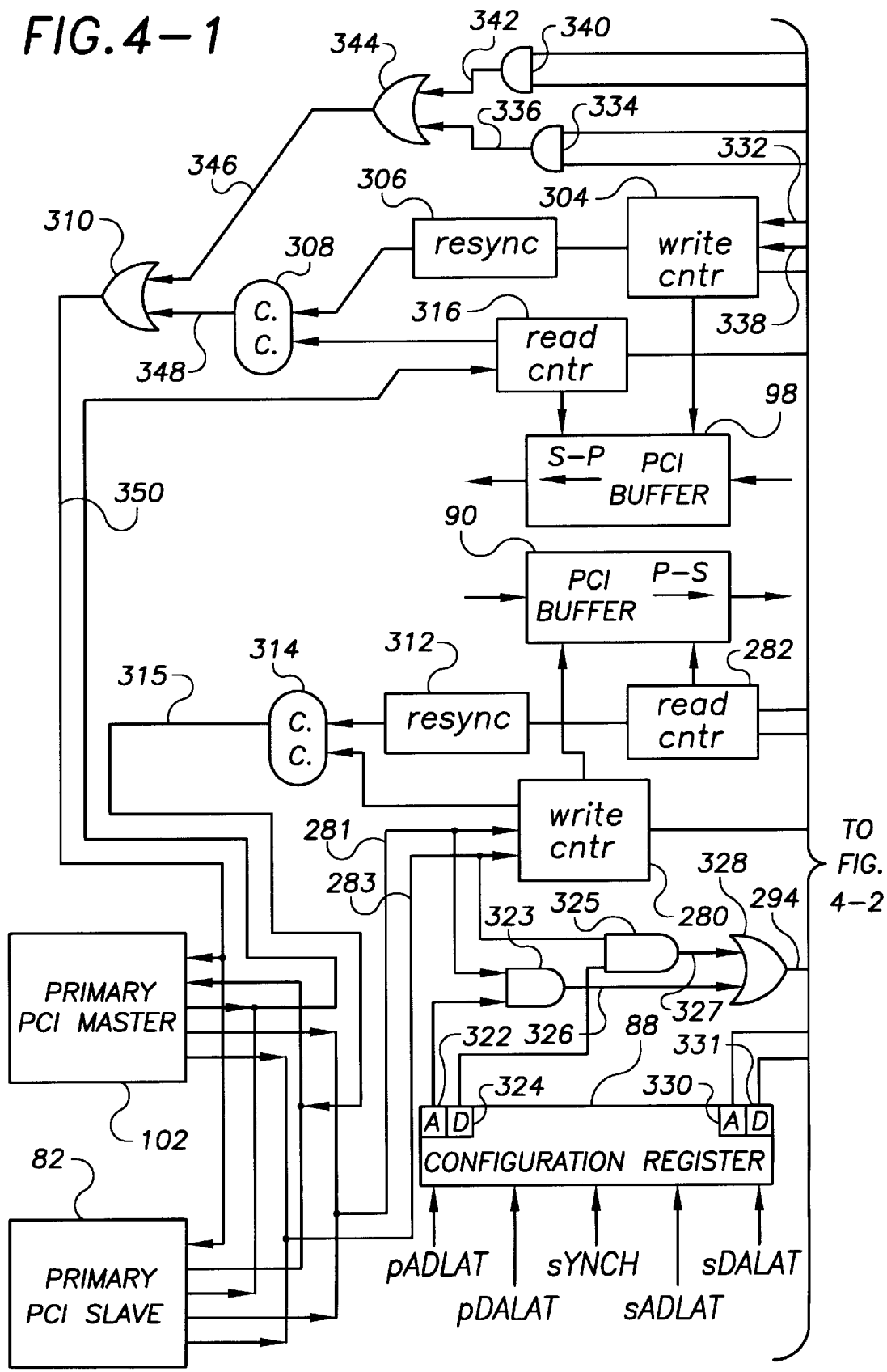
FIG. 4 illustrates a read-write control circuit within the PCI bridge chip, according to a first embodiment of the present invention.
Figures 2, 4:
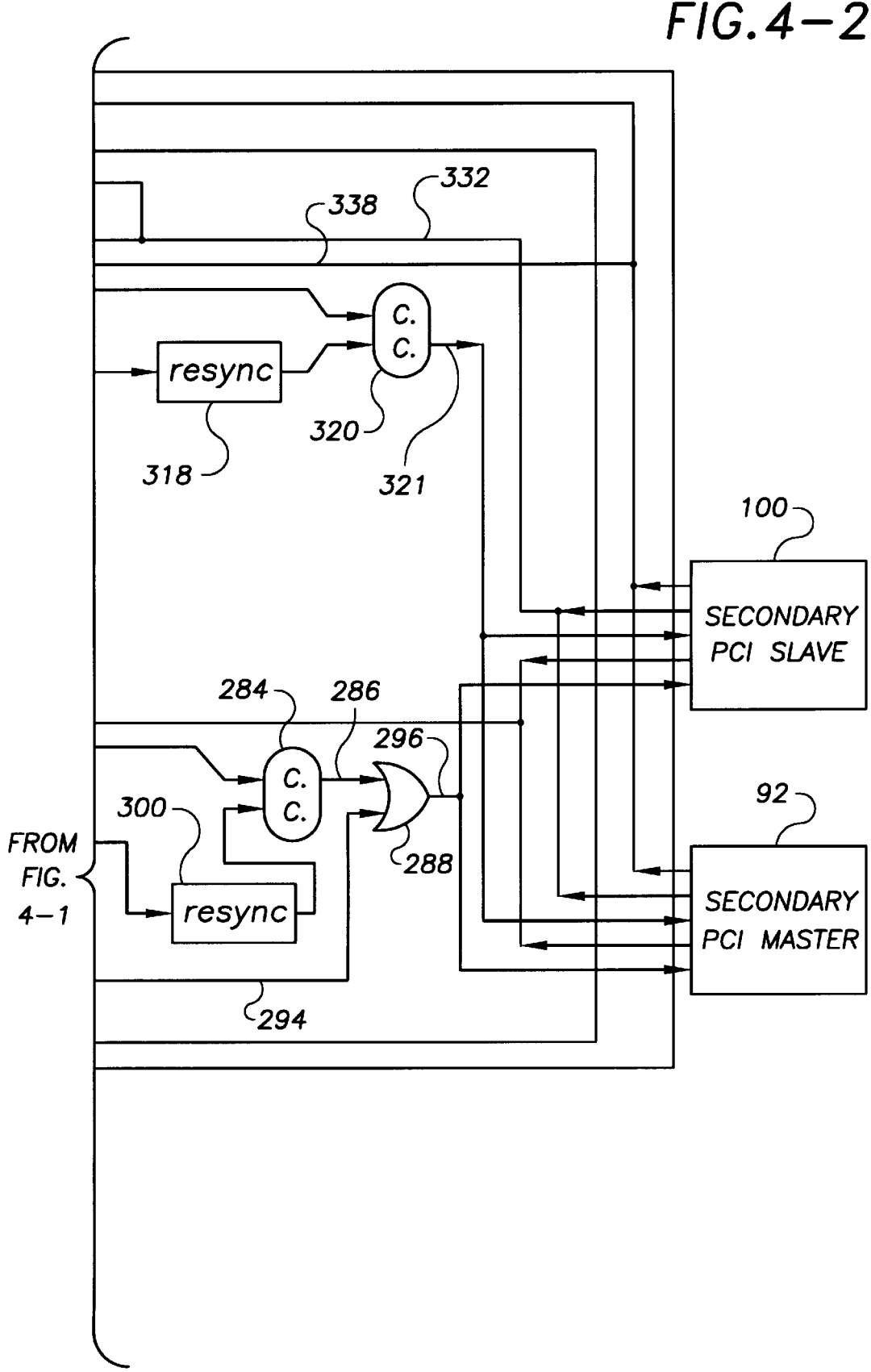

Latency reduction control of the PCI bridge chip is described in greater detail connection with FIG. 4, which illustrates read-write control of the P-S and S-P PCI buffers 90 and 98.

The P-S write counter 280 is incremented by the primary PCI slave 82 whenever the primary PCI slave 82 places address and command information or data and byte enable information into the P-S PCI buffer 90. In addition, the primary PCI master 102 increments the P-S write counter 280 whenever the primary PCI master 102 receives read data or status. The write counter 280 is incremented by the address increment signal 281 when address information is written to the P-S PCI buffer 90, and by the data increment signal 283 when data information is written. The P-S read counter 282 is incremented by the secondary PCI master 92 whenever it receives address and command information or data and byte enable information from the P-S PCI buffer 90. In addition, the secondary PCI slave 100 increments the P-S read counter 282 whenever the secondary PCI slave 100 receives read data or status from the P-S PCI buffer 90.

The value of the P-S write counter 280 is passed to the counter compare circuit 284 ("C.C.") via a resynchronizer 300. The resynchronizer 300 resynchronizes the signal from the P-S write counter 280 if the clocks of the primary and secondary buses are asynchronous (first clock mode). If the clocks are synchronous (second clock mode), or if the primary clock is used to drive the secondary clock (third clock mode), then the skew between clocks is constant and the resynchronizer 300 has no effect on the relative timing of the signal from the P-S write counter 280 to the counter compare circuit 284. The counter compare circuit generates the buffer busy signal 286 whenever it detects that the P-S read counter 286 and P-S write counter 280 are different.

The second counter compare circuit 314 is used to stop information being written to the P-S PCI buffer 90 when the P-S PCI buffer 90 no longer has memory to accept more information. The second counter compare circuit 314 compares the value of the P-S write counter 280 with the value of the P-S read counter 282 after the read counter value has been resynchronized to the primary clock, if necessary, in the second resynchronizer 312. Whenever the difference in write counter value and read counter value reaches a large value, preferably 28, the second counter compare circuit 314 asserts a Ram_stop signal 315 on the primary PCI slave and master 82 and 102. The Ram_stop signal 315 signals a disconnect in the middle of a sequence or forces a retry to any new request when the difference in write and read counter values is 28 or more. Once the difference in write and read values falls below 28, Ram_stop is de-asserted and information transfer may recommence.

Address information requires to be decoded in a single clock by the resource decoder 84 before the information is ready to be passed across the P-S PCI buffer 90. Data information does not need to be decoded by the resource decoder 84 before passing across the P-S PCI buffer 90, since the address is already set. Thus, data information is typically ready in the P-S PCI buffer 90 at an earlier stage in a clock cycle than is address information. Another important aspect of the invention is that the programmable configuration register 88 is provided with the ability to independently select the by-pass configuration, alternatively known as the low latency configuration, for data and address information. The PCI bridge 28 also allows for the by-pass feature in data transfer in either direction.

The inputs to the programmable configuration register 88 include the configuration bits pADLAT, PDALAT, sADLAT and sDALAT. The bit pADLAT enables low latency transfer of address information from the primary PCI bus 81 to the secondary PCI bus 83. The bit pDALAT enables low latency transfer of data information from the primary PCI bus 81 to the secondary PCI bus 83. The bit sADLAT enables low latency transfer of address information from the secondary PCI bus 83 to the primary PCI bus 81, and the bit sDALAT enables low latency transfer of data information from the secondary PCI bus 83 to the primary PCI bus 81.

Another important aspect of the invention is low latency transfer of information from the primary side to the secondary side. The programmable configuration register 88 generates two outputs for turning on low latency primary to secondary transfer. These are the primary to secondary address low latency output 322 and the primary to secondary data low latency output 324. Whenever one of these outputs 322 and 324 is high, low latency is enabled for passing information through the PCI bridge 28. The primary to secondary address low latency output 322 is ANDed in address latency AND gate 323 to generate an address latency enable signal 326. The primary to secondary data low latency output 324 is ANDed in data latency AND gate 325 to generate a data latency enable signal 327. The address and data latency enable signals are ORed in the latency enable OR gate 328 to generate the by-pass signal 294. The by-pass signal 294 and the buffer busy signal 286 are input to the OR gate 288 to generate the data ready signal 296 which is then passed to the secondary PCI master 92 and the secondary PCI slave 100, to indicate that information is ready in the P-S PCI buffer 90. Thus the secondary side of the bridge 24 is advantageously informed that data is ready in the P-S PCI buffer 90 when latency is enabled in the programmable configuration register 88 for either address or data information.

Since the PCI bridge 24 is symmetrically arranged for information transfer, there is a similar arrangement for implementing low latency information transfer from the secondary side to the primary side.

The programmable configuration register 88 generates the secondary to primary address low latency output 330 and the secondary to primary data low latency output 331. The secondary to primary address low latency output 330 is ANDed with the secondary to primary address write counter increment signal 332 in the secondary address AND gate 334 to generate the secondary address latency enable signal 336. Similarly, the secondary to primary data low latency output 331 is ANDed with the secondary to primary data write counter increment signal 338 in the secondary data AND gate 340 to generate the secondary data latency enable signal 342. The secondary address and data latency enable signals 336 and 342 are ORed in the secondary latency enable OR gate 344 to generate the secondary by-pass signal 346. The secondary by-pass signal 346 and the secondary buffer busy signal 348 are input to the secondary OR gate 310 to generate the secondary data ready signal 350 which is then passed to the primary PCI master 102 and the primary PCI slave 82 to indicate that information is ready in the S-P PCI buffer 98. Thus the primary side of the bridge 24 is advantageously informed that data is ready in the S-P PCI buffer 98 when latency is enabled in the programmable configuration register 88 for either address or data information.

Figure 5A:
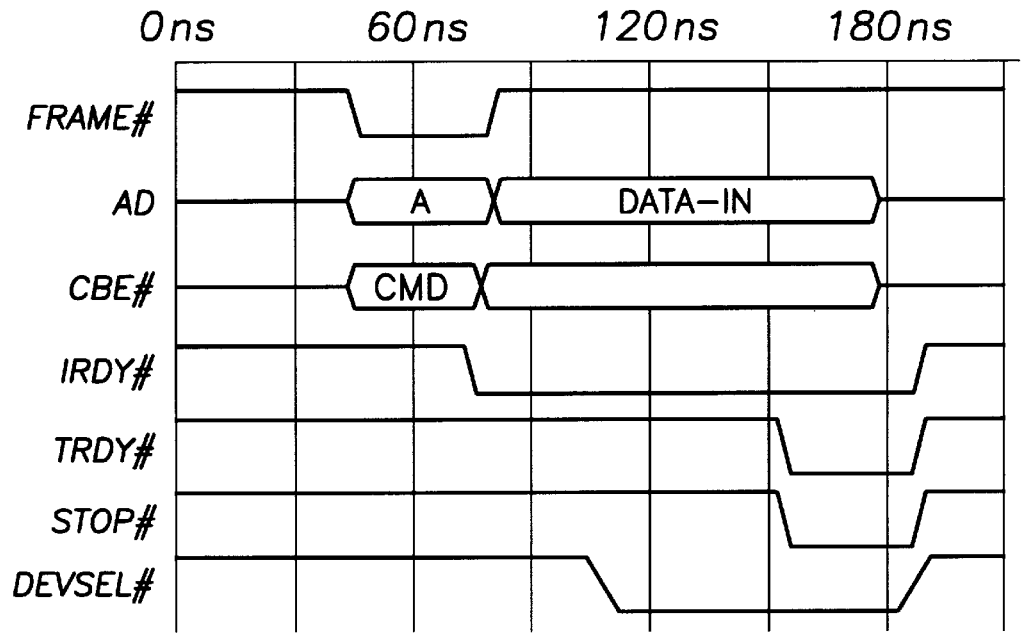
FIGS. 5A and 5B illustrate the timing for respective configuration write and read cycles.
Figure 5B:
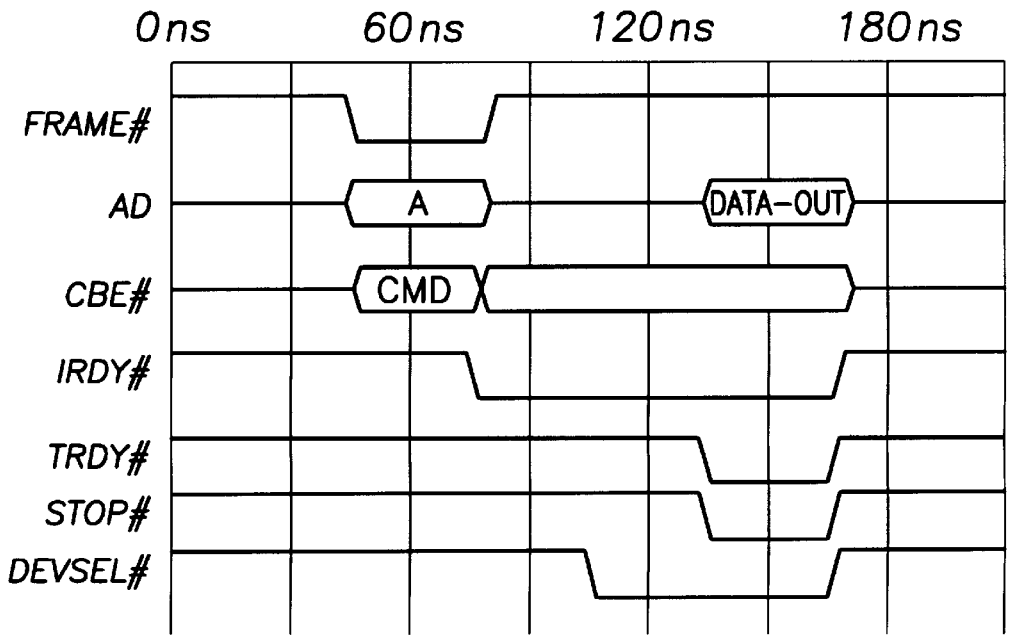

FIGS. 5A and 5B illustrate timing diagrams for write and read cycles for the programmable configuration register 88. A clock rate of 33 MHz is assumed, corresponding to a clock period of ~30 nanoseconds. The primary PCI bus 81 is assumed to be connected to a medium responder device. DEVSEL# is asserted two clock cycles after FRAME# when the connected device is a medium responder. With reference to the configuration write cycle illustrated in FIG. 5A, FRAME# is asserted on pFRAME 120 by the primary PCI bus 81 for one clock cycle to start the bus cycle. Upon assertion of FRAME#, address information AD is written on pAD 114 to the address/data buffer 188 of the P-S PCI buffer 90 and to the programmable configuration register 88. Command information CMD is written on pC/BE 116 to the command/byte enable buffer 182 of the P-S PCI buffer 90. Address information AD and command information CMD are written during only one clock cycle. IRDY# is asserted on pIRDY 122 one clock cycle after FRAME#, to indicate that the PCI bridge 24 is able to complete data information transfer. IRDY# is asserted until the end of the transaction. On configuration write cycles, if the bridge 24 is selected during a primary PCI master initiated configuration cycle and the connected device is a medium responder, then the bridge 24 asserts DEVSEL# on pDEVSEL 118 two clock cycles after the assertion of FRAME#. One clock cycle after the address information has been written, the data information, Data-in, is written on pAD 114. Data is strobed into the programmable configuration register 88 after the second clock cycle after IRDY# is asserted. TRDY# is asserted on PTRDY 122 three clock cycles after IRDY# is asserted. STOP# is asserted on PSTOP 126 with TRDY# to terminate data transfer. Typically, STOP# may also abort and retry data transfer, if DEVSEL# and TRDY# are not both asserted when STOP# is asserted.

With reference to the configuration read cycle illustrated in FIG. 5B, address and command information are received in the same first clock cycle as FRAME# is asserted. IRDY# is asserted one cycle after FRAME# and indicates that the initiating side is ready to receive the read. The requested configuration register data, Data-out, is driven onto AD. TRDY# is asserted three clock cycles after FRAME#.

Figures 1, 6:
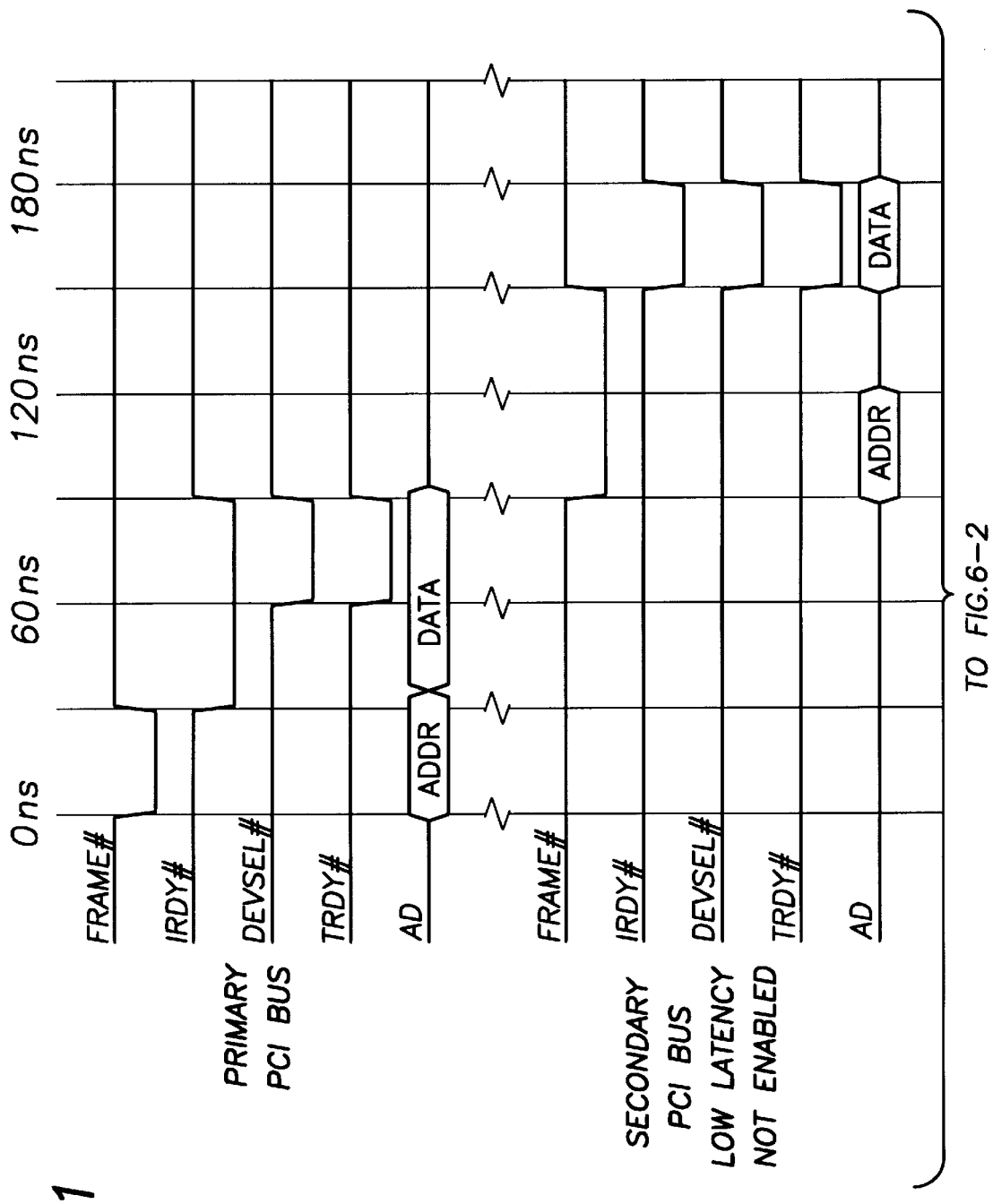
FIG. 6 illustrates the information transfer timing for a posted write operation, contrasting timing where low latency is enabled with timing where low latency is not enabled.
Figures 2, 6:
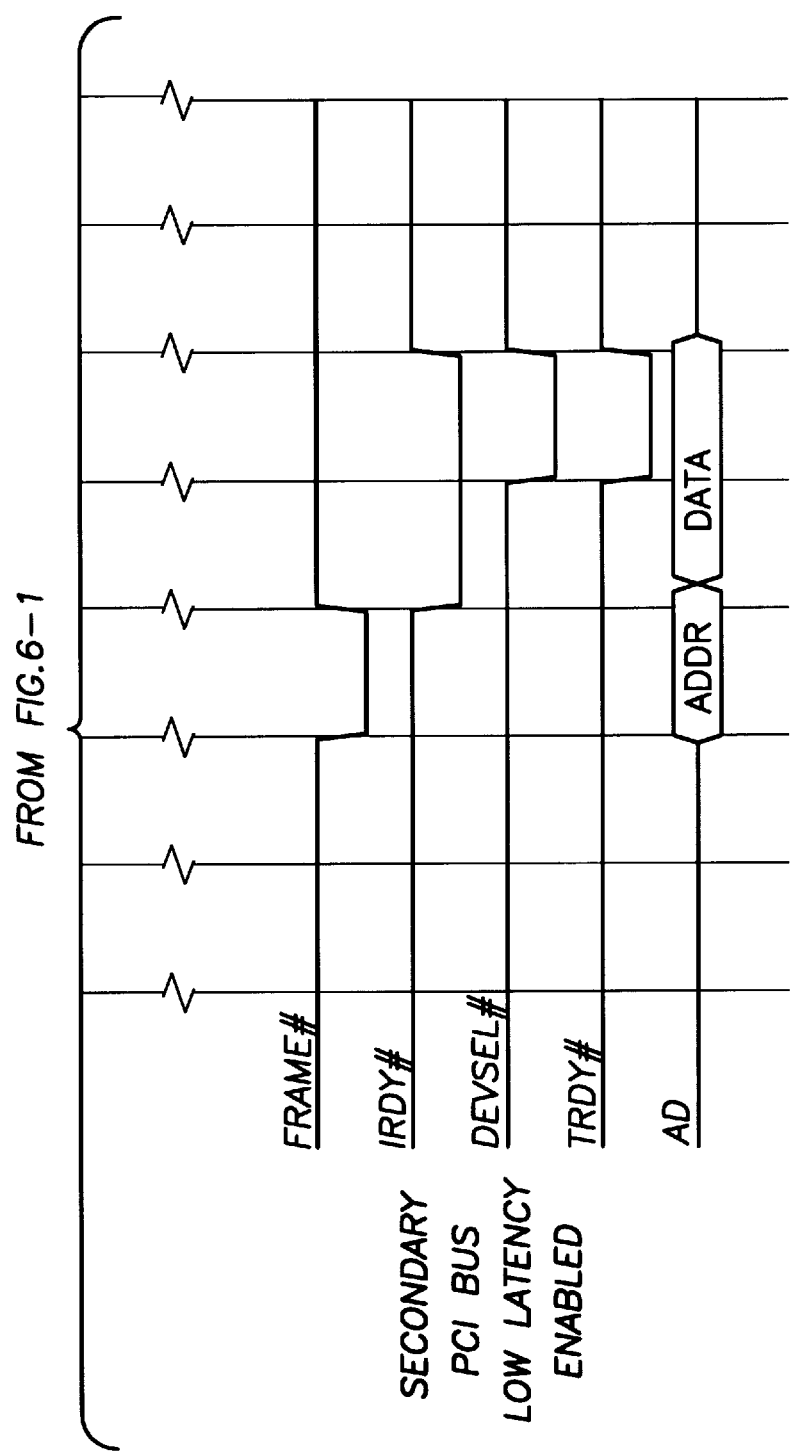

Timing diagrams for transfer of information across the bridge 28 are illustrated in FIG. 6, which shows timing for a single data transfer for a posted write and compares the data transfer time when low latency is not enabled with when low latency is enabled. It is assumed that the posted write is being made to a medium responder and that the clock rate is 33 MHz. The upper portion of FIG. 6 illustrates timing on the primary PCI bus 81 when writing to the secondary PCI bus 83. FRAME# is asserted on pFRAME 120 by the primary PCI bus 81 for one clock cycle to initiate the bus transfer routine. Address information is written on pAD 114 into the P-S PCI buffer 90 during the clock cycle when FRAME# is asserted. IRDY# is asserted on pIRDY 122 one clock cycle after FRAME#, to indicate that the PCI bridge 28 is able to complete data information transfer. IRDY# is asserted until the end of the transaction on the primary side. Data information is written on pAD 114 to the address/data buffer 188 in the P-S PCI buffer 90 during the clock cycle immediately following the address writing cycle. Since it is assumed that the device on the primary side is a medium responder, DEVSEL# is asserted on PDEVSEL 118 one clock cycle after the assertion of IRDY#. DEVSEL# is assertable one clock cycle earlier when the device on the primary side is a fast responder, or one clock cycle later when the device on the primary side is a slow responder. TRDY# is asserted on pTRDY 124 one clock cycle after IRDY# is asserted. The assertion of data on pAD 114 is stopped within one clock period of TRDY# being asserted.

When there is no low latency in the bridge 28, the timing of signals on the secondary PCI bus 83 is as shown in the center portion of FIG. 6. FRAME# is asserted on sFRAME 136 when the data ready signal 296 is asserted on the secondary PCI master 92. In the case where low latency is not enabled, FRAME# is asserted after the P-S write counter 280 has incremented to generate a data ready signal 296. The P-S write counter 280 is incremented at a time following the first complete clock cycle when data is asserted on pAD 114. The address information is written to the secondary PCI bus 83 on sAD 130 when FPAME# is asserted on sFRAME 136. FRAME# is asserted on sFRAME 136. Since the responding device is assumed to be a medium responder, FRAME# is asserted for two clock cycles, at which point IRDY# is asserted on sIRDY 138, DEVSEL# is asserted on sDEVSEL 134 and TRDY# is asserted on sTRDY 140. When the responding device is a fast responder, DEVSEL# may be asserted one clock cycle earlier, or one clock cycle later if the device is a slow responder.

When low latency is enabled, as shown in the lower portion of FIG. 6, the data ready signal 296 is produced when data is read into the address/data buffer 188, a clock cycle earlier than when low latency is not enabled. Thus FRAME# is asserted on sFRAME 136 within one clock cycle or less of data being read into the address/data buffer 188, which is one clock cycle earlier than in the case where low latency was not enabled. FRAME# is asserted on sFRAME 134 for one clock cycle. The address information is written out from the address/data buffer 188 when FRAME# is asserted on sFRAME 136. IRDY# is then asserted on sIRDY 138 on the clock cycle following the assertion of FRAME# on sFRAME 136, allowing data to be written from the address/data buffer 188 immediately following the writing of address information. During the cycle after IRDY# is asserted, DEVSEL# and TRDY# are asserted on sDEVSEL 134 and sTRDY 140 respectively, to close out the cycle. Thus, for posted writes, the bridge 24 may complete data transfer from the primary PCI bus 81 to the secondary PCI bus 83 one clock cycle earlier then when low latency is not enabled. The reduction in data transfer time does not depend on the speed of the responder on the secondary side.

Figure 7:
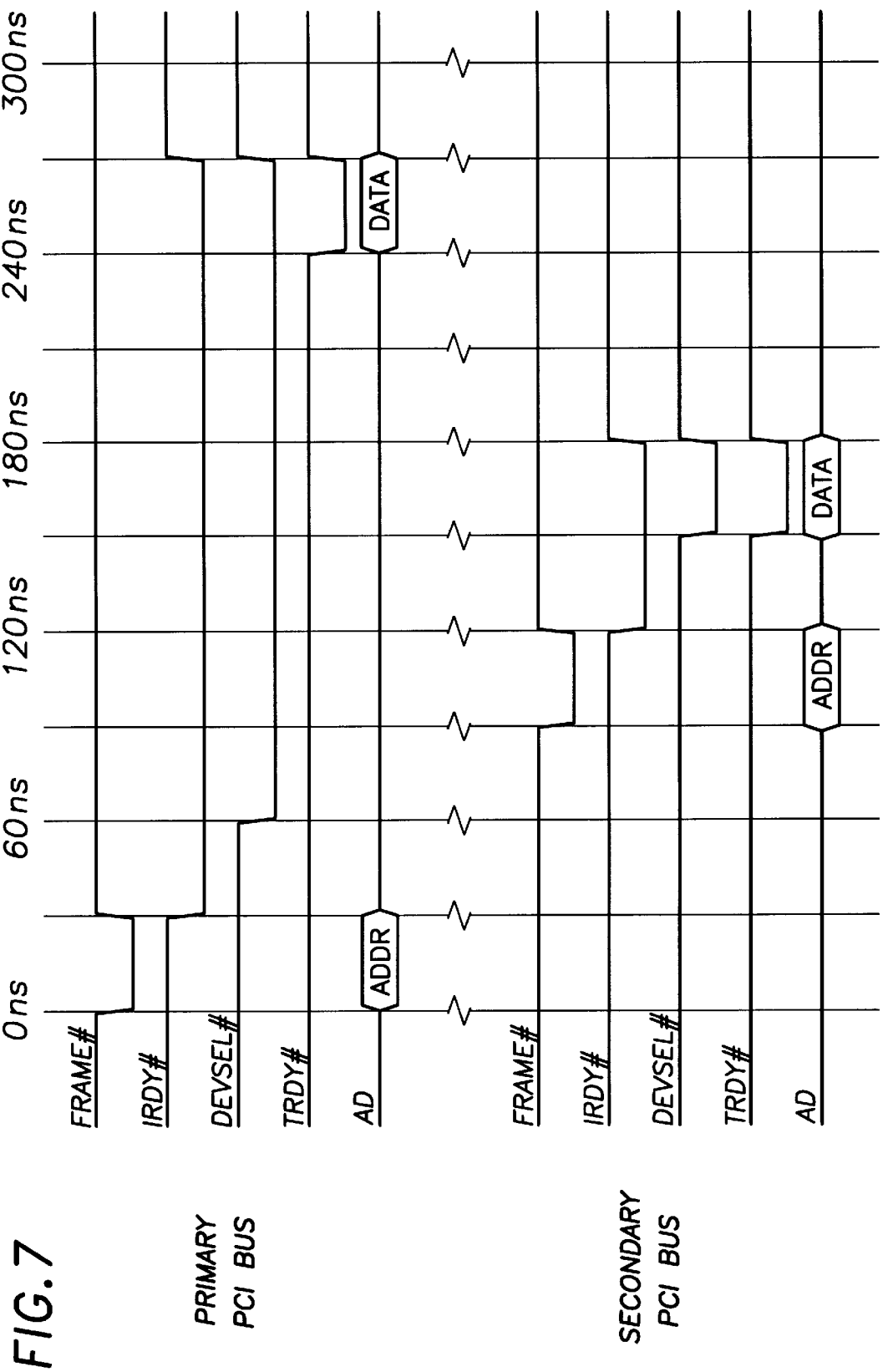
FIG. 7 is a timing diagram for a read operation where low latency is not enabled.

Timing diagrams are shown in FIG. 7 for a read cycle, single data transfer where there is no low latency capability according to the present invention. It is assumed that the clock runs at 33 MHz and that the primary PCI bus 81 is connected to a medium responder, and that responding device on the secondary PCI bus 83 is a medium responder.

FRAME# is asserted on PFRAME 120 by the primary PCI bus 81 for one clock cycle to initiate the read cycle. Address information is written on pAD 114 into the P-S PCI buffer 90 during the clock cycle when FRAME# is asserted. IRDY# is asserted on pIRDY 122 one clock cycle after FRAME#, to indicate that the PCI bridge 24 is able to complete data information transfer. IRDY# is asserted until the end of the transaction on the primary side. DEVSEL# is asserted on pDEVSEL 118 one clock cycle after the assertion of IRDY#. The P-S write counter 280 is incremented after the address information is been presented on pAD 114. Increment of the P-S write counter 280 is detected by the counter compare circuit 284 in the clock cycle following increment of the P-S write counter 280. The counter compare circuit 284 generates the buffer busy signal 286 which, in turn, generates the data ready signal 296 which is transmitted to the secondary PCI master 92. Thus, the secondary PCI master 92 is informed that there is information in the P-S PCI buffer more than one clock cycle after the P-S write counter 280 is incremented.

FRAME# is asserted on sFRAME 136 at the beginning of the clock cycle following receipt of the data ready signal by the secondary PCI master 92. FRAME# is asserted on sFRAME 136 for one clock cycle. The address information is presented on sAD 130 to the secondary PCI bus 83 simultaneously with FRAME# on sFRAME 136. IRDY# is asserted on sIRDY 138 one clock cycle after FRAME# is asserted. One clock cycle after the assertion of IRDY# on sIRDY 138, data is presented on sAD 130 to the address/data buffer 200 of the S-P PCI buffer 98, and DEVSEL# and TRDY# are asserted on sDEVSEL 134, and sTRDY 140 respectively. The S-P write counter 304 is incremented after the data information has been presented on sAD 130. Increment of the S-P write counter 304 is detected by the counter compare circuit 308 in the clock cycle following increment of the S-P write counter 304. The counter compare circuit 308 generates the buffer busy signal 348 which, in turn, generates the data ready signal 350 transmitted to the primary PCI master 102. Thus, the primary PCI master 102 is informed that there is information in the S-P PCI buffer 98 more than one clock cycle after the S-P write counter 304 is incremented. TRDY# is asserted on pTRDY 124 at the beginning of the clock cycle following receipt of the data ready signal 350 by the primary PCI master 102. The data is presented on pAD 114 along with TRDY# on PTRDY 124. The read cycle closes out the following clock cycle with IRDY#, DEVSEL#, and TRDY# being de-asserted from PIRDY 122, pDEVSEL 118, and pTRDY 124 respectively. In the read cycle just described, the requested data is returned eight clock cycles after the read cycle was initiated.

Figure 8:
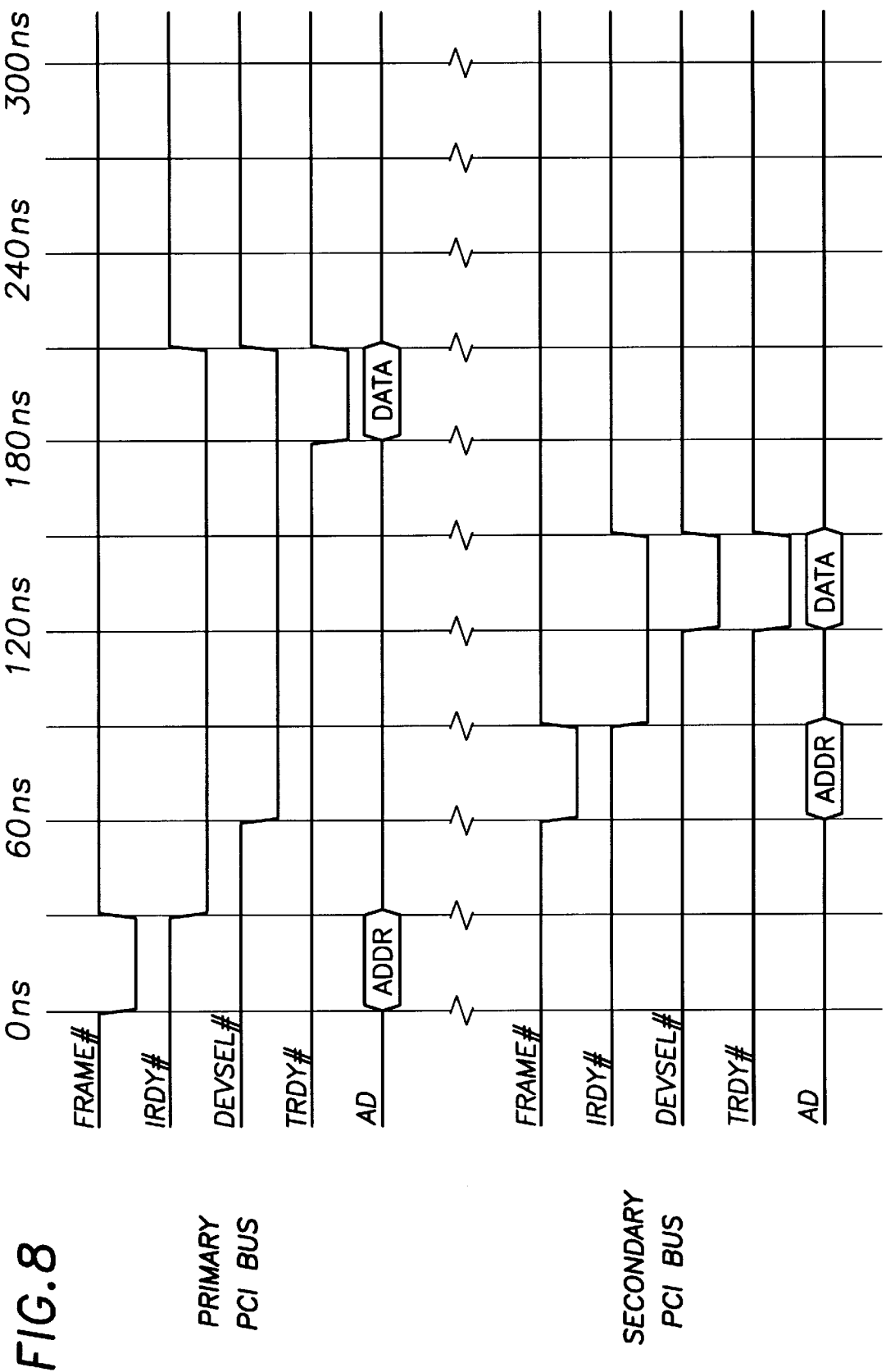
FIG. 8 is a timing diagram for a read operation where low latency is enabled.

Timing diagrams are shown in FIG. 8 for a read cycle, single data transfer using the same assumptions as made for the transfer illustrated in FIG. 7, but where low latency according to the present invention is enabled. FRAME# is asserted on pFRAME 120 by the primary PCI bus 81 for one clock cycle to initiate the read cycle. Address information is written on pAD 114 into the P-S PCI buffer 90 during the clock cycle when FRAME# is asserted. IRDY# is asserted on pIRDY 122 one clock cycle after FRAME#, to indicate that the PCI bridge 28 is able to complete data information transfer. IRDY# is asserted until the end of the transaction on the primary side. DEVSEL# is asserted on pDEVSEL 118 one clock cycle after the assertion of IRDY#. The P-S write counter 280 is incremented after the address information is been presented on pAD 114. Increment of the P-S write counter 280 generates the bypass signal 294 which, in turn, generates the data ready signal 296. Thus, the secondary PCI master 92 may be informed that there is information in the P-S PCI buffer during the same clock cycle as the P-S write counter 280 is incremented.

FRAME# is asserted on sFRAME 136 at the beginning of the clock cycle following receipt of the data ready signal 296 by the secondary PCI master 92. FRAME# is asserted on sFRAME 136 for one clock cycle. The address information is presented on sAD 130 to the secondary PCI bus 83 simultaneously with FRAME# on sFRAME 136. IRDY# is asserted on sIRDY 138 one clock cycle after FRAME# is asserted. One clock cycle after the assertion of IRDY# on sIRDY 138, data is presented on sAD 130 to the address/data buffer 200 of the S-P PCI buffer 98, and DEVSEL# and TRDY# are asserted on sDEVSEL 134, and sTRDY 140 respectively. The S-P write counter 304 is incremented after the data information is presented on sAD 130. Increment of the S-P write counter 304 generates the bypass signal 346 which, in turn, generates the data ready signal 350. Thus, the primary PCI master 102 is informed that there is information in the S-P PCI buffer 98 during the same clock cycle as the S-P write counter 304 is incremented. TRDY# is asserted on pTRDY 124 at the beginning of the clock cycle following receipt of the data ready signal 350 by the primary PCI master 102. The data is presented on pAD 114 along with TRDY# on pTRDY 124. The read cycle closes out the following clock cycle with IRDY#, DEVSEL#, and TRDY# being de-asserted from pIRDY 122, pDEVSEL 118, and pTRDY 124 respectively. In the low latency read cycle, the requested data is returned six clock cycles after the read cycle was initiated, rather than eight as was described for the read cycle without low latency, giving a reduction in read time of two clock cycles. A similar reduction in read time is afforded by the low latency read cycle when the device on the secondary side is either a fast responder or a slow responder.

Figure 9:
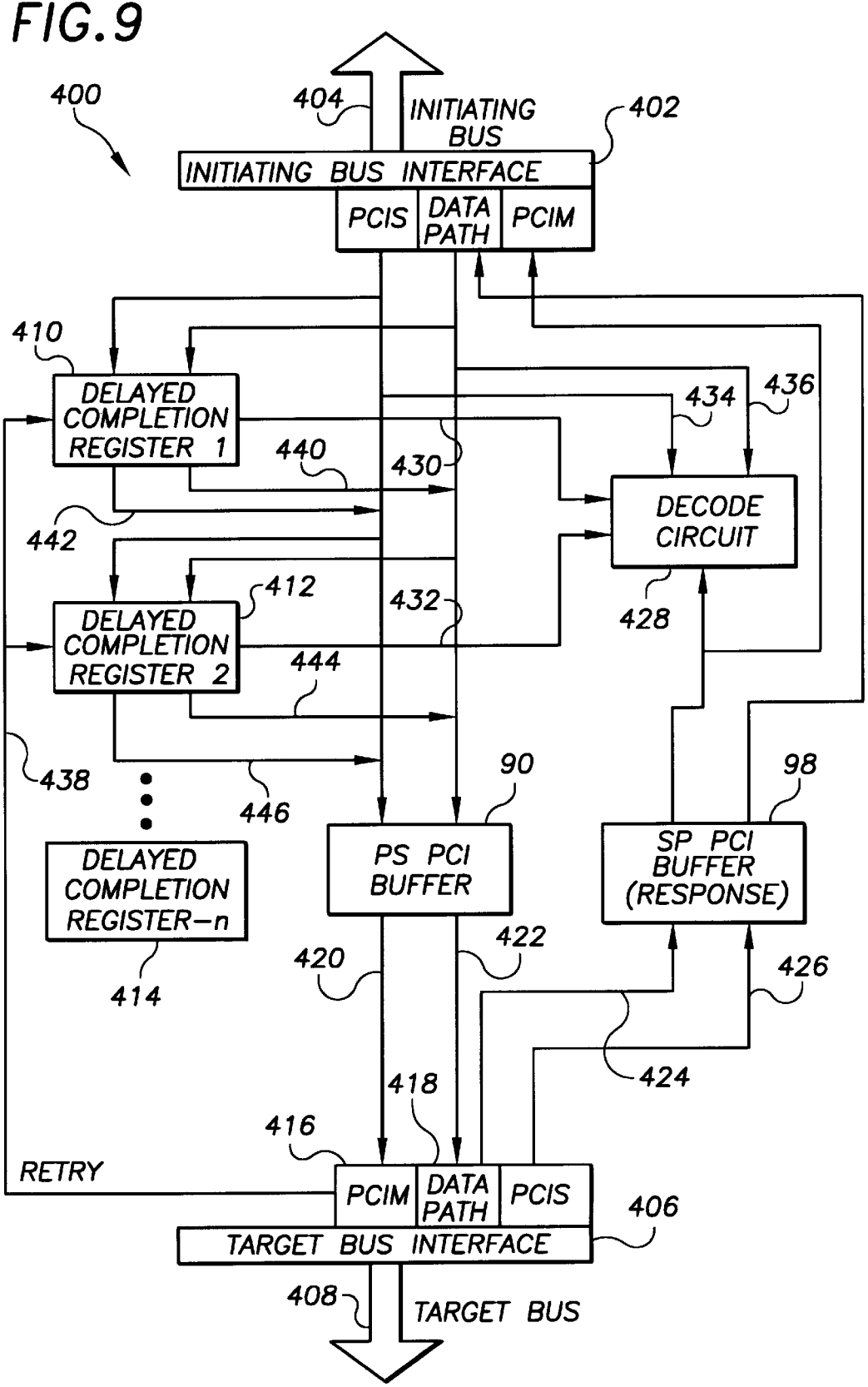
FIG. 9 is a block diagram of one embodiment of a bus interface system in accordance with the present invention.

Referring now to FIG. 9, a bus interface system 400 is illustrated which provides an initiating bus interface 402 to an initiating bus 404, and a target bus interface 406 to a target bus 408. It should be recognized that the bus interface system 400 (the "bridge") is coupled between two buses, either of which can initiate data transfers. Therefore, while FIG. 9 depicts an initiating bus 404 and a target bus 408, it should be understood that a device coupled to the target bus could also initiate data transfers, thereby effectively causing the bus interface 406 to represent the initiating bus interface and the bus interface 402 to represent the target bus interface.

The delayed completion register1 410 and delayed completion register2 412 each store one complete command, including the address, data, command code, and byte enable information sent from the initiating bus interface 402. The delayed completion registers are also referred to as "retry registers", for reasons described more fully below. FIG. 9 shows two delayed completion registers 410 and 412, however more delayed completion registers can be used, as represented by delayed completion register-n 414. Where there are two devices which can initiate commands on the initiating side, then two delayed completion registers will suffice. Where a larger number of command-initiating devices are present on the initiating side, a correspondingly larger number of delayed completion registers are used.

A command entering the initiating bus interface 402 is stored in the P-S PCI buffer 90 and in one of the delayed completion registers, for example, delayed completion register1 410. The state of a flag determines which of the delayed completion registers will receive a given command. The command exits the P-S PCI buffer 90 in a first-in-first-out fashion, as the P-S PCI buffer 90 in one embodiment is a first-in-first-out (FIFO) data queue. The command information enters the target side of the bus bridge at the PCI master (PCIM) 416 and the data path 418 via buses 420 and 422 respectively. The PCIM 416 and the data path 418 provide the command to the target bus 408 via the target bus interface 406.

A targeted device coupled to the target bus 408 is expected to provide a response back to the initiating bus interface 402 within 16 cycles where the buses are PCI buses. Where the targeted device successfully completes the command, it responds with a command response to the S-P PCI buffer, or response buffer, 98. The address and data information is provided to the response buffer 98 via bus 424, and the command code and byte enable information is provided to the response buffer 98 via bus 426. The S-P PCI buffer 98 queues the returned data or command responses in a first-in-first-out sequence, which results in responses queued in the order that they were completed on the target bus 408.

It is often the case that the targeted device can not complete the command within the allotted time, which is 16 clock cycles for PCI bus architectures. In such cases, the initiating device is directed to reissue the command to the bus interface system 400. The reissued command is compared against the contents of the associated delayed completion register, and if there is a match, the predetermined time period (16 cycles in this example) again begins to toll, while another attempt to complete the command occurs at the targeted device.

The decode circuitry 428 compares the control code of the control buffer 214 to a predetermined value that corresponds to one of the delayed completion registers. The delayed completion register that corresponds to the predetermined value which matches the control code is then cleared by the decode circuit 428, when it is determined that a command has been reissued. In order to determine whether a command has been reissued, the decode circuit 428 must also compare the command currently holding on the initiating bus 404 with the command stored in the delayed completion register corresponding to the control code. For this reason, the command from the delayed completion register corresponding to the control code is sent to the decode circuitry 428 via bus 430 or 432, and is compared to the command holding on the initiating bus 404 which is routed to the decode circuitry 428 via buses 434 and 436. For instance, the control code may indicate that the command response is associated with delayed completion register1 410, but the contents of delayed completion register1 410 are compared to the command currently holding on the initiating bus 404 to know that the command has been reissued. If a match is found, then the clearing function is performed to clear the delayed completion register and the corresponding location of the P-S PCI buffer 90, on the basis that the reissued command is to be canceled because it has already been successfully completed.

A command may also be retried at the request of the targeted device at the target bus interface 406. When the initiating bus provides a reissue command, the reissued command gets only as far as the comparison to the delayed completion registers, and is not reissued across the bridge. A reissue command is only provided across the bridge from the delayed completion registers as a result of a retry signal passed from the target bus to the delayed completion registers. Where the targeted device is not able to complete the command, the PCIM 416 can issue a retry signal on line 438 to the delayed completion registers 410 or 412, depending on the control code. Upon receiving the retry signal on line 438, the selected delayed completion register will queue the command again, by driving its stored command to the P-S PCI buffer 90. For the delayed completion register1 410, the command will be driven to the P-S PCI buffer 90 via buses 440 and 442. For the delayed completion register2 412, the command will be driven to the P-S PCI buffer 90 via buses 444 and 446.

The bus bridge architecture of the present invention is configured such that the bridge operates as both a target device and an initiator device. An initiating device is coupled to an initiator bus, which is in turn coupled to an initiating bus interface of the bus bridge. A target bus interface of the bus bridge is coupled to a target bus, which is coupled to the targeted device. However, data transfer may be initiated in the opposite direction, such that a device on the aforementioned target bus may initiate data transfers, thereby reversing the roles of the initiating and target buses described above. Furthermore, the bus bridge acts as both a target device and an initiating device, as it is a target of an initiating device's request, and an initiator of that request to the targeted device on the target bus.

On the initiating bus, an initiating device initiates a command for data from a targeted device. The bus bridge queues the command, and the initiating device expects to receive a response from the bus bridge within a predetermined time. In one embodiment of the invention, this predetermined time is sixteen clock cycles. If the data is not available to be supplied by the bus bridge within this time period, then the bridge issues a retry response the initiating bus.

On the target side of the bridge, the bridge acts as an initiator once the command is received from the initiating bus. The bridge initiates the command to the target bus, and similarly expects to receive a response from the target bus within a predetermined time, which in one embodiment of the invention is sixteen clock cycles. If the data is not available at the target device, the bridge receives a retry from the target bus. The retry initiated on the target side of the bridge is therefore different than the retry initiated on the initiating side of the bridge.

The memory read multiple command in accordance with the present invention takes advantage of a situation where a number of data bytes greater than the cache line size are desired. Upon receipt of this command, the target side of the bridge starts a read-ahead operation which will attempt to fill the response buffer in the bridge. Where the initiating device is active, i.e., not in a delayed completion state, the initiating bus can retrieve the data from the response buffer as the target bus fills the response buffer. Therefore, the response buffer may never reach its capacity, because the data in the FIFO response buffer is concurrently being removed by the initiating bus and filled by the target bus. In this case, the bridge is able to accomplish long transfers of data. The present invention also allows for such a transfer to be suspended if the initiating device is in a delayed completion state, and allows for other data transfers to take place, so that the bridge is not unnecessarily monopolized by any one data transfer. This is described more fully below.

FIG. 10 is a flow diagram illustrating one embodiment of a multiple memory read operation of an indeterminate number of data bytes across a bus bridge in accordance with the present invention. A "read multiple" command is initiated 460 at an initiating device on the initiating bus. The bus bridge queues the command, and when the command is at the top of the command queue it is issued by the bridge to the target bus. The target side of the bridge then begins a read-ahead operation which attempts to fill a response buffer in the bridge, as illustrated at block 462. If the initiating device is not removing data from the response buffer as seen at block 464, the initiating device is in a delayed completion state 466. If, however, the initiating device is available to unload the response buffer, the initiating bus removes data from the response buffer while the target bus fills the response buffer from the target side of the bus, as seen at block 468. When the initiating device receives all of the desired data as seen at block 470, any extraneous data in the response buffer is discarded 472, and the multiple memory read operation is complete. If the initiating device has not yet received all of the data which it requested, the response buffer continues to be filled by the target side of the bridge, and the response buffer continues to supply the initiating bus with requested data, as again seen at block 468. Because the response buffer is a first-in-first-out (FIFO) buffer, it can be filled by the target side of the bridge while the initiating side of the bridge concurrently removes other data in the response buffer. In this manner, long data transfers between devices on different buses can be accomplished with minimal delays.

Figure 11A:
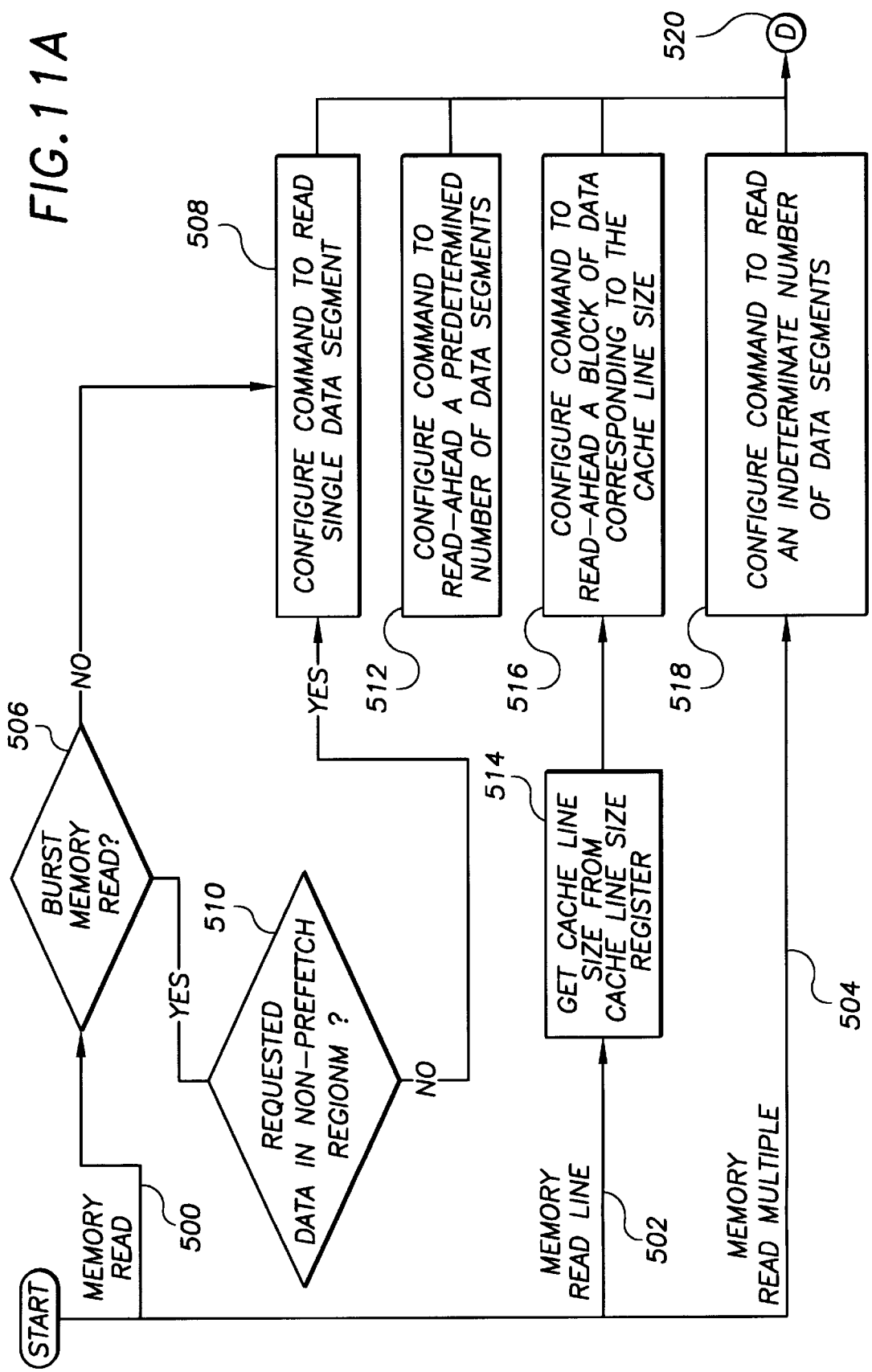
FIGS. 11A and 11B, is a flow diagram illustrating one manner in which various read commands, including the memory read multiple command, are managed on the initiating side of the bus bridge in accordance with the principles of the present invention.
Figures 1, 11B:
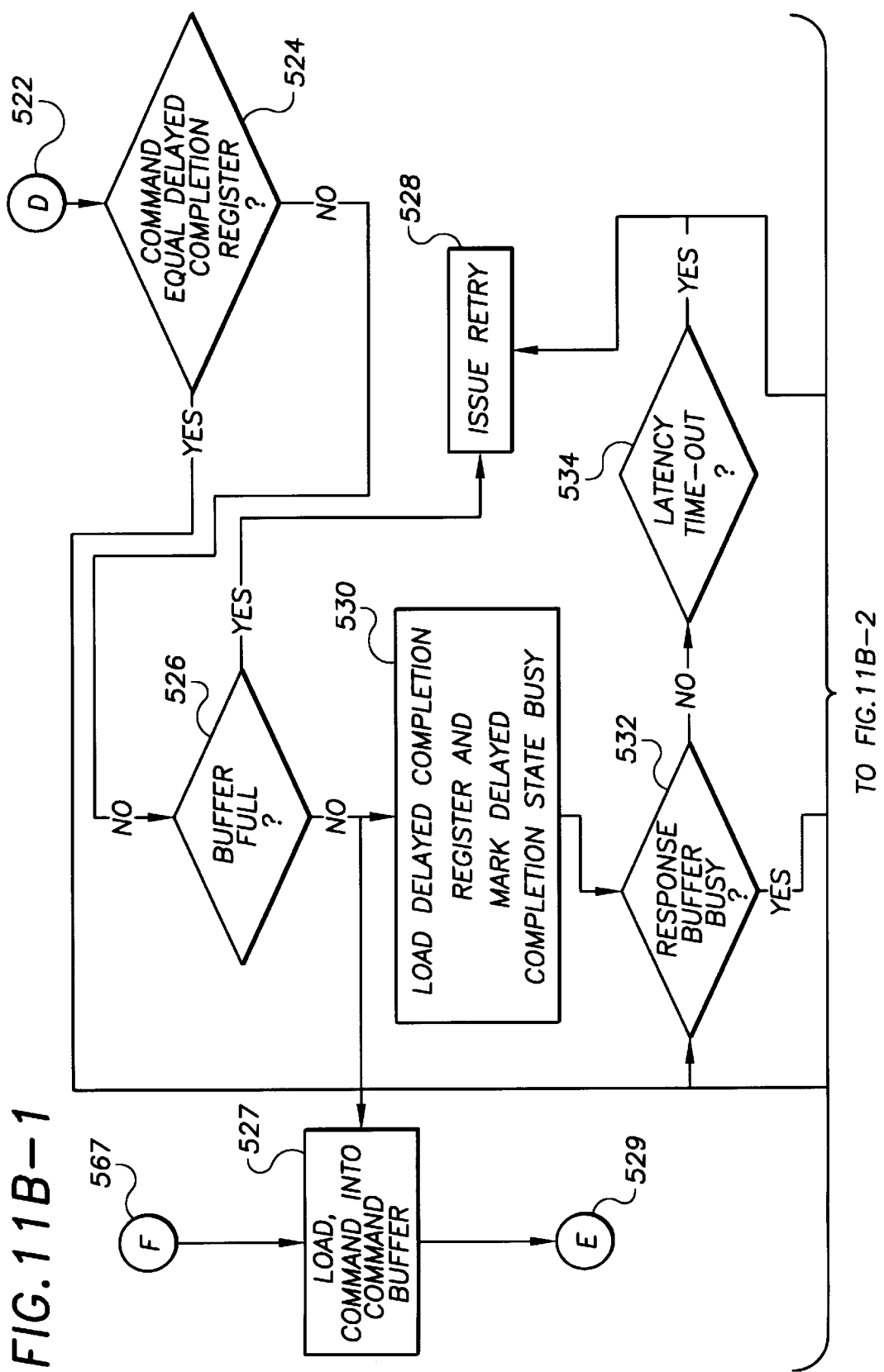

FIG. 11, including FIGS. 11A and 11B, is a flow diagram illustrating one manner in which various read commands, including the memory read multiple command, are managed on the initiating side of the bus bridge in accordance with the principles of the present invention. FIG. 11A illustrates three different types of memory read commands that may be used in the PCI-to-PCI bridge architecture, including the memory read command on path 500, the memory read line command on path 502, and the aforementioned memory read multiple command on line 504.

A standard memory read command, shown on path 500, is used for a single data transmission (i.e., no data burst). The memory read command is initiated on the originating bus, destined for the target bus. Where the requested data transmission is not a request for a burst memory read, decision block 506 provides for reading a single data segment, and configuring 508 a command to read the single data element. There is no read-ahead for single data element reads.

Single data segment commands are also configured 508, where it is determined 510 that a request for a data burst from a non-prefetchable region is made. In such a case, the burst memory reads are handled as single data reads to prevent read-ahead of data in the non-prefetch region. The target bus transmits the single data segment with a disconnect command returned with the first data phase. This disconnect command prevents any read-ahead in the non-prefetch region.

When the requested data is in a prefetchable region, a command is configured 512 to read ahead a predetermined number of data segments. In one embodiment of the invention, the memory read command that requests a data burst will cause a read-ahead of eight double words on the target side. A read-ahead of a relatively small number of double words from the target bus allows for a short data burst without taking up a great deal of bandwidth on the target bus. Where a read-ahead command of a predetermined number of data segments has been configured 512, the command is issued on the initiating bus.

The memory read line command depicted on line 502 is initiated by a device on the originating bus to the target bus.

The memory read line command is used to obtain a cache block size burst of memory data. The cache line size is obtained from the cache line size register, as generally illustrated at block 514. The cache line size can be any binary multiple, and is contained in the configuration registers 88. Issuance of the memory read line command causes a command to be configured 516 to read-ahead a block of data corresponding to the cache line size specified by the cache line size register.

The memory read multiple command on line 504 is also initiated by a device on the originating bus to the target bus. The memory read multiple command is used where a data request is made for a block of data being larger than the cache line size. The memory read multiple command is configured 518, in accordance with the present invention, to continually transfer the requested data from a target device on the target bus to the S-P PCI buffer 98. Upon receiving the configured memory read multiple command, the target side of the bridge will begin a read-ahead operation which will attempt to fill the S-P PCI buffer 98. If the initiating device enters a delayed completion condition while the target device is filling the buffer 98, the read-ahead operation will stop when the buffer 98 is full. If, however, the initiating device is still active from its origination or was successfully retried while the bridge was filling the buffer, and the initiating device is in the process of moving data from the buffer 98 to the initiating device, the transfer can continue until the initiating device stops unloading the data from the buffer 98. Therefore, the bridge is able to accomplish long data transfers when possible, but does not tie up the bridge unnecessarily.

When the initiating device enters a desired command into the command buffer, it concurrently enters the command into a corresponding delayed completion register (where one is available). Where a response is not available for the initiating bus in a predetermined time, a reissue response is issued to the initiating device itself, so that the initiating device can reissue the command, and the initiating bus interface moves into what will be referred to as a delayed completion state.

FIG. 11B illustrates one embodiment of the execution of the memory read multiple command once it has been issued on the initiating bus. After the memory read multiple command has been configured and issued on the initiating bus as seen at block 518 of FIG. 11A, processing continues to FIG. 11B via links "D" 520 of FIG. 11A and 522 of FIG. 11B. When the command is initially issued on the initiating bus, it is determined 524 whether the command is equal to a command currently being stored in a delayed completion register. The use of the delayed completion register allows a command to be re-entered onto the command queue in a target retry situation. By comparing the command from the initiating bus to the command in the delayed completion register at block 524, the command will not be re-entered into the P-S buffer 90 if the command is already in the delayed completion register. If the command is not equal to any of the commands in the delayed completion registers, it is determined 526 whether the delayed completion registers are full. This determination is performed in order to determine whether the delayed completion register is available to continue.

In one embodiment of the invention, determining whether the buffer is full at block 526 includes determining whether the S-P write counter 304 and the S-P read counter 316 differ by a predetermined number (refer to FIG. 4). This predetermined number indicates the address difference of the starting and ending S-P PCI buffer 98 locations which currently occupy data returned from the target bus. The predetermined number depends on the size of the buffer implemented, and in one embodiment of the invention has a value of 28 for a 32-word buffer. In this embodiment, a Ram_stop signal is activated when the S-P write counter 304 has advanced 28 locations past the S-P read counter 316. This is described in greater detail in connection with the description of FIG. 14.

If no delayed completion registers are available as determined at block 526, an immediate retry command is issued 528 to the originating device, and no delayed completion is activated. Where the delayed completion registers are not full, the delayed completion register is loaded with the command, which stores the address, command and byte enables for later comparison, and the delayed completion state is marked as busy, as shown at block 430. Furthermore, the command is loaded 527 into the S-P PCI buffer 98 to trigger the release of the command from the command buffer to the target bus, as illustrated by link "E" 529 to link "E" 560 of FIG. 12.

When it is determined 532 that the response buffer is not busy, indicating that the desired response entry does not exist in the response buffer, it is determined 534 whether a latency timer has timed out. Where there are no entries in the response buffer, a latency timer determines whether information is entered into the response buffer prior to a predetermined time period, which in one embodiment of the invention corresponds to 16 clock cycles. If information is returned by the target device to the response buffer prior to the expiration of the latency timer, processing returns to decision block 532, where it will then be recognized that the response buffer is busy. If, on the other hand, the latency timer times out, a retry command is issued to the originating device as indicated by block 528, so that the originating device can reissue the command.

Where it is determined that the response buffer is busy, it is determined 536 whether or not the response in the response buffer matches the command stored in the corresponding delayed completion register. Therefore, it is determined whether a tag which is associated with the response data matches an active command. Where there is no match, a retry command is issued 528 to the originating device. This quick response determination eliminates the need to wait for a 16 clock cycle latency, as is required through the use of the latency timer. Therefore, if the bridge buffer has to respond to a different retry command or needs to issue a command itself on the bus, the bus can be released sooner than through the latency time out procedure.

Where the determination 536 indicates that a response match occurred, it is determined 538 whether or not particular information in the response buffer is the last entry of the desired data requested by the memory read multiple command. The last entry is marked when it is put into the buffer from the target side of the bridge. All single read commands are marked as a last entry, as it is the sole entry. Commands requesting multiple data reads from the targeted device, such as the memory read multiple command, include one piece of information so marked, which corresponds to the last piece of information in the multiple data packet. Where it is determined 538 that it is the last entry, the "delay completion state" is reset 540 from its busy status. Furthermore, the initiating device is notified of the last data entry of the particular data block, which terminates 542 the initiator command, and provides all data in the data packet previous to the last entry back to the initiating device.

Where the particular data segment recognized in the response buffer is not marked as the last entry, the top entry of the response buffer is transferred back to the initiating device as depicted at block 544. Where the command indicates a request for more data as determined at block 546, processing returns to block 532 to again determine 478 whether the response buffer is busy. Assuming the target device is providing the requested data to the response buffer, this data transfer loop may continue until the initiating device receives all of its desired data. When the initiating device has received all of its requested data specified by the memory read multiple command as determined at block 546, the "delay completion state" is reset from its busy status, and the "delayed completion clear" status is set as seen at block 548. The delayed completion clear state is the state that is used to clear excessive entries from the response buffer. The various delayed completion states are described in greater detail in connection with FIG. 13. Any extraneous data received at the response buffer from the target bus is discarded 550 until it is determined 552 that the last entry to be discarded has been reached. Upon recognition of the last entry, the delayed completion clear state is reset 554.

Figure 12:
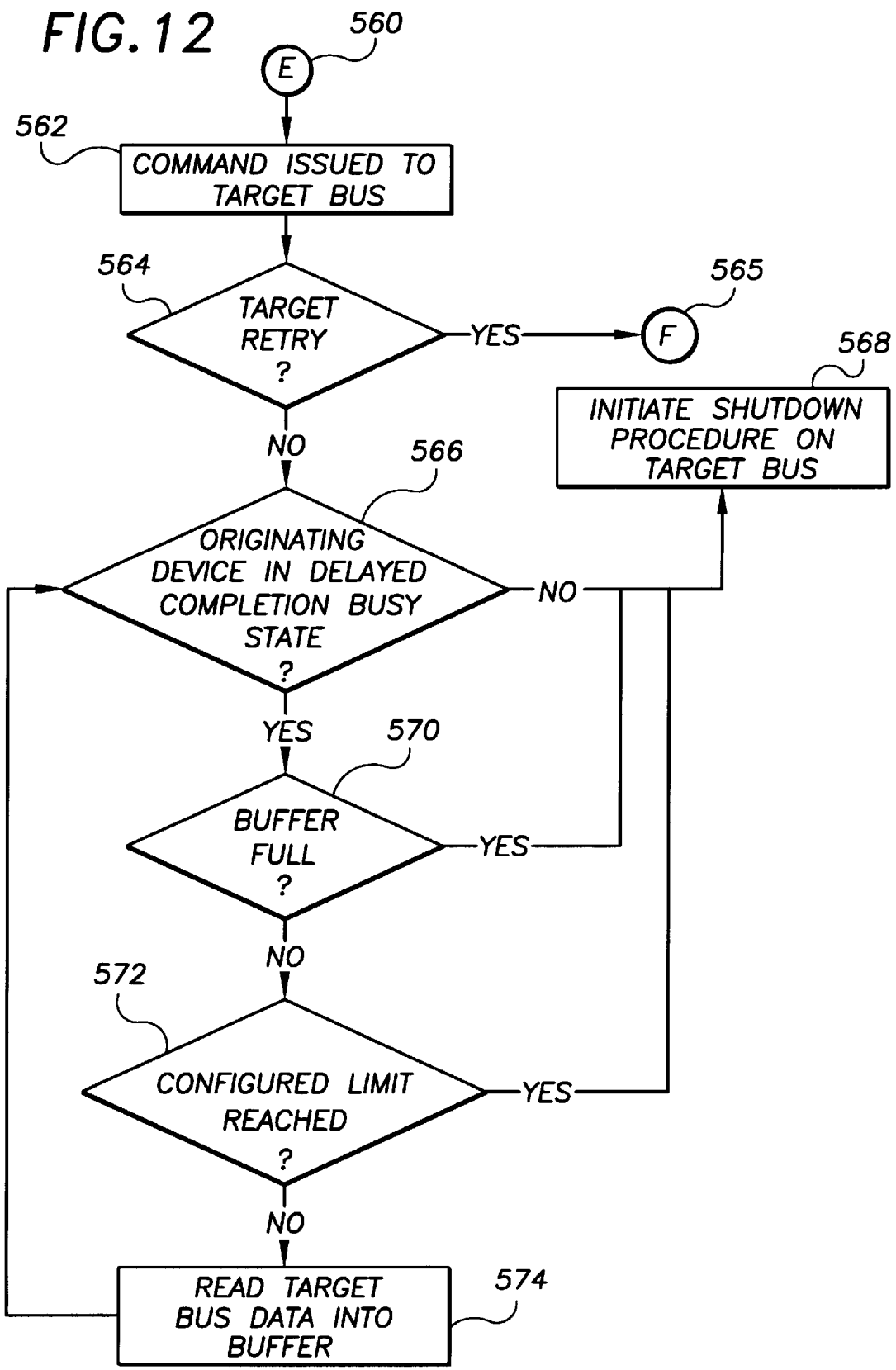
FIG. 12 is a flow diagram illustrating one embodiment of the actions performed on the target side of the bridge during a memory read multiple command.

FIGS. 11A and 11B described an embodiment of the invention directed to the initiating bus side of the bridge. FIG. 12, on the other hand, is a flow diagram illustrating one embodiment of the actions performed on the target side of the bridge during a memory read multiple command. Where the initiating device is active with the memory read multiple command, and where the data returned from the target device is next in the S-P PCI buffer 98 (i.e., at the top of the FIFO), the data can be continually and directly transferred between the initiating and target devices. Therefore, there are two conditions in allowing this direct transfer: first, the originating device is not be in a delayed completion condition; and second, the corresponding response is available and ready for transfer in the response buffer. When these conditions are met, the data can be continually transferred from the target device, to the S-P PCI buffer 98, to the initiating device. FIGS. 11A and 11B illustrated how the originating device could remove the requested data from the response buffer, and FIG. 12 below describes how the response buffer is filled from the target side of the bridge.

Referring now to FIG. 12, link "E" 560 corresponds to link "E" 529 of FIG. 11B. The command in the command buffer is issued to the target bus as illustrated at block 562. If the target device cannot provide a response within a predetermined time, a retry signal is issued. If a target retry signal is required as determined at block 564, the command in the delayed completion register is again loaded into the command buffer as illustrated by links "F" 565 and 567 of FIGS. 12 and 11B respectively. As indicated by links "E" 529, 560, the command is then again issued to the target bus as illustrated at block 562. If no target retry is necessary, it is determined whether the originating device is in a delayed completion busy state as determined at block 566. If not, a shutdown procedure is initiated 568 on the target bus. If the originating device is in a delayed completion busy state, the response buffer capacity is determined 570, and if the response buffer is full, the shutdown procedure is initiated 568 on the target bus. Therefore, the impetus to suspend the data transfer prior to completion of the data transfer on the target side of the bridge is the delay completion busy state, or reaching the capacity of the response buffer. The target bus shutdown procedure 568 is also initiated when the configured limit of the memory read multiple command has been reached 572, which occurs when all the requested data has been transferred to the originating device via the S-P PCI buffer 98. In one embodiment of the invention, this termination process from the primary PCI bus 81 (see FIG. 2B) includes asserting pSTOP 126, which provides an indication to the target device to halt the data transfer process. In such a case, the target device continues to send data to the buffer until it receives an indication from the originating device that the originating device received a complete data block. Therefore, when the originating device sends the pSTOP signal to terminate the data transfer process, additional data may be present in the buffer which was not part of the desired data block. This additional data is discarded, as was described in connection with FIG. 11B, in order to clear the response buffer and prepare it for the next data transfer. Where the originating device is in a delayed completion state, the response buffer is not full, and the configured limit has not been reached, the target bus data will continue to be read into the response buffer, as illustrated at block 574.

Figure 13:
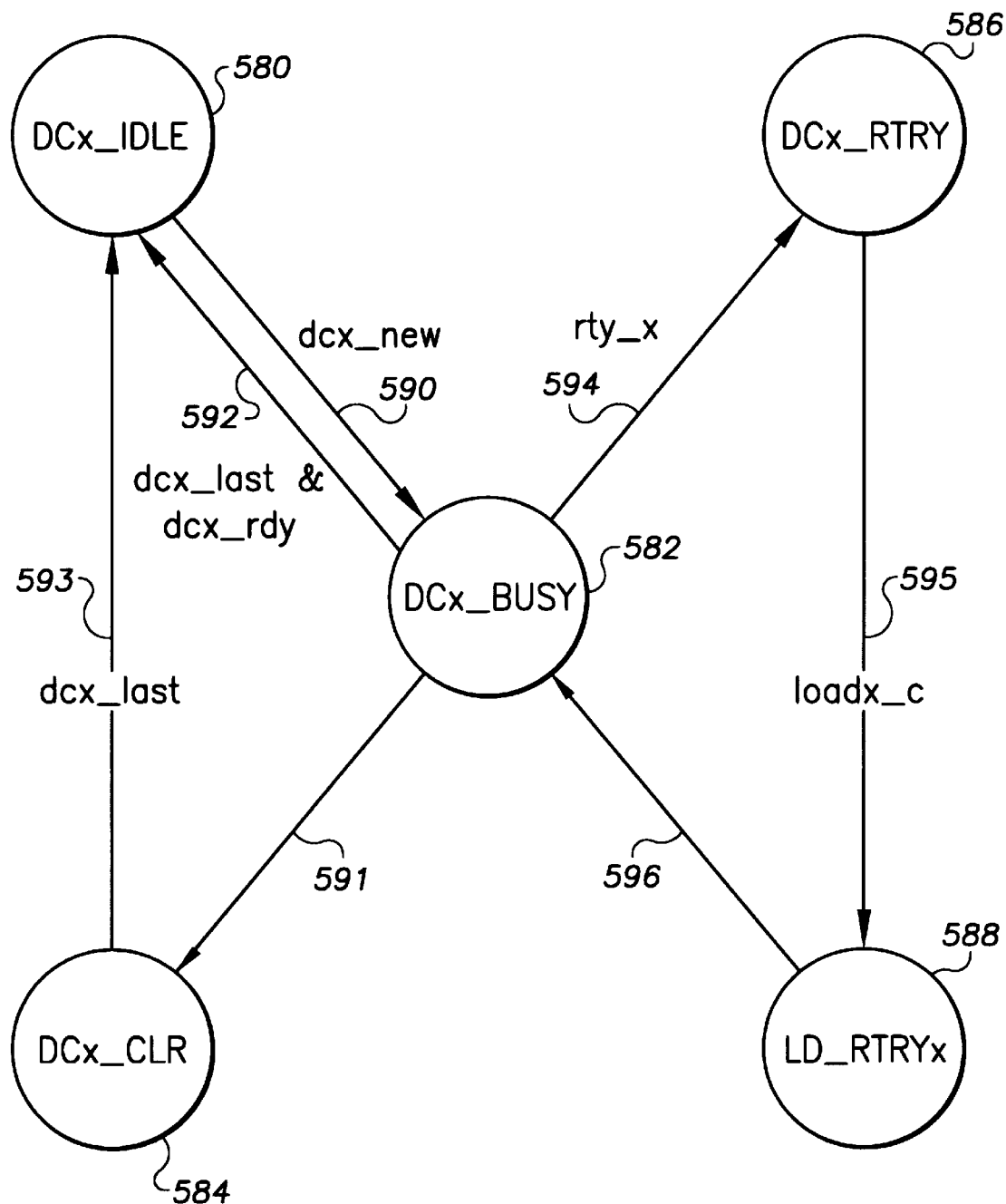
FIG. 13 is a state flow diagram illustrating one configuration of the delayed completion state machines in accordance with the principles of the present invention.

FIG. 13 is a state flow diagram illustrating one configuration of the delayed completion state machines in accordance with the principles of the present invention. Each of the delayed completion registers in the system, such as delayed completion registers 410, 412 through 414 of FIG. 9, operates in substantially the same manner so that each can be represented by a common state flow diagram. Therefore, FIG. 13 applies to the state machines for both delayed completion register1 410 and register2 412. Accordingly, each state machine has at least five states, which are shown as DCx_IDLE 580, DCx_BUSY 582, DCx_CLR 584, DCX_RTRY 586, and LDx_RTRY 588, where "x" represents the particular delayed completion register.

The DCx_IDLE state 580 represents the state where no action is pending in the delayed completion register. When a non-posted cycle is initiated in the bridge, at least one of the delayed completion registers must be in the idle state.

The state machine will transition from the DCx_IDLE state 580 to the DCx_BUSY state 582 upon the occurrence of a dcx_new signal shown on line 590. The state of two flags, SEL_1 and SEL_2, determine which of the two state machines in this example will be used. Either of these two flags can be set to reflect which delayed completion register is idle and can therefore be used. The DCx_BUSY state 582 will remain active until either a retry is received from the opposite master block or a response is received through the FIFO with an active matching command in the PCI registers. If more data exists in the FIFO than is requested by the command, then the state will transition to the DCx_CLR state 584 to remove the excess entries, as indicated by line 591. Otherwise, when the transaction is complete, the state will return to the DCx_IDLE state 580, as seen by the dcx_last & dcx_rdy signals shown on line 592.

The DCx_CLR state 584 is used to clear excessive entries from the response buffer, and is set from the DCx_BUSY state 582. When the last entry is detected, the state machine will return to the DCx_IDLE state 580, as seen by the dcx_last signal on line 593.

The DCX_RTRY state 586 is entered when the opposite master returns a retry signal to the slave block, as indicated by line 594. While in the DCx_RTRY state 586, the DCx_RTRY state 586 causes a reload of the saved command in the delayed completion register into the command buffer (PS PCT buffer 90), and then will transition to the LDx_RTRY state 588.

The LDx_RTRY state 588 exists for one cycle and will load the data and byte enables into the PS PCI buffer 90 behind the address and command, as represented by the loadx_c signal on line 595. From the LDx_RTRY state 588, it will transition back to the DCx_BUSY state 582 as represented by line 596.

Figure 14:
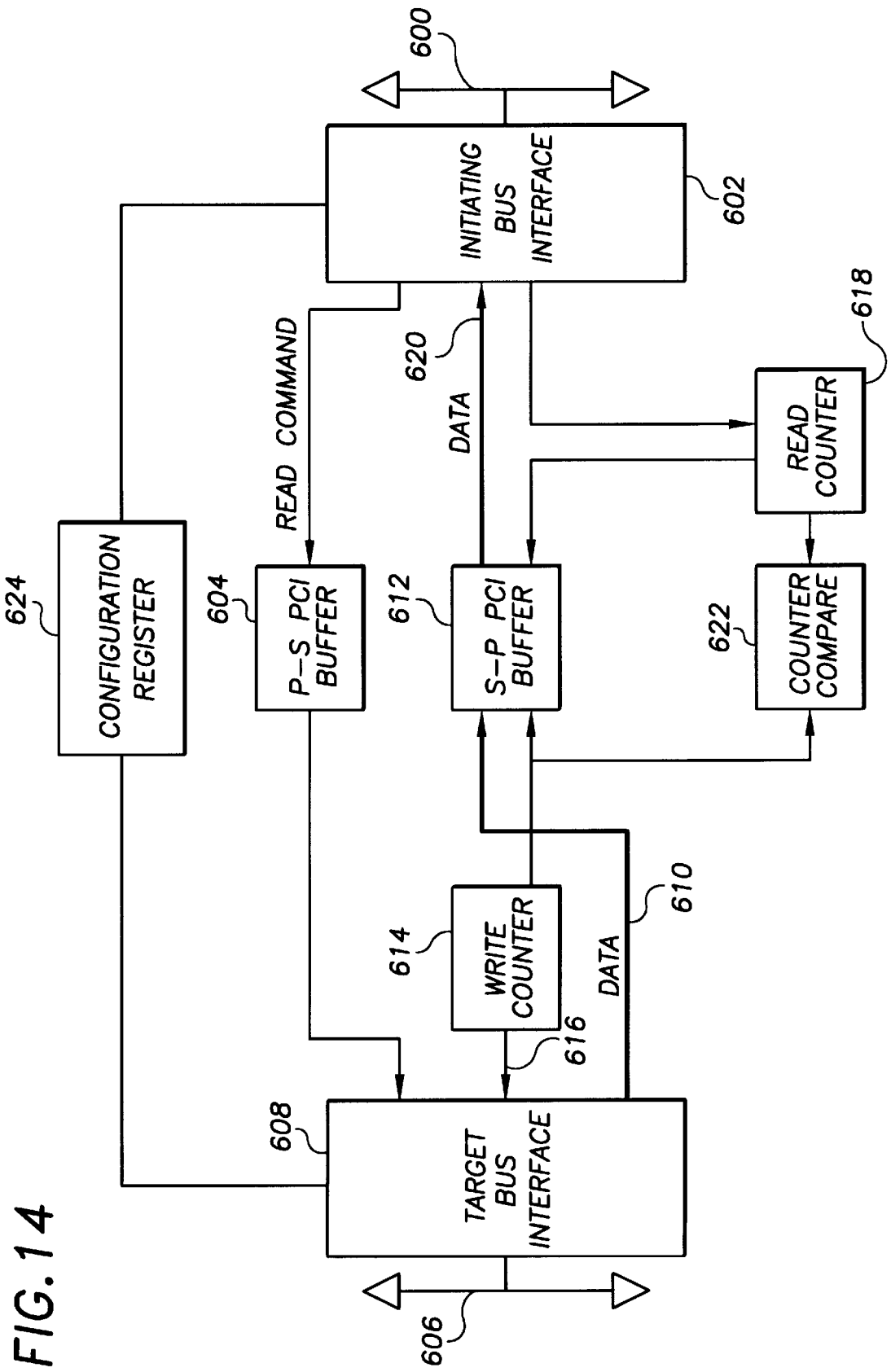
FIG. 14 is a block diagram illustrating one embodiment of buffer occupancy level detection in accordance with the invention.

Referring now to FIG. 14, a block diagram illustrating one embodiment of the data buffer occupancy level detection is provided. A device on the initiator bus 600 provides a command, such as a read command, to the initiator bus interface 602. The read command is queued in the P-S PCI buffer 604, and is ultimately issued to the target bus 606 through the target bus interface 608.

As the targeted device transfers the requested data shown on line 610 to the S-P PCI buffer 612, the write counter 614 is incremented by an address increment signal shown on line 616. In addition, the read counter 618 is incremented each time a queued data segment outputs the S-P PCI buffer 612 to return the data on line 620 to the initiating bus interface 602. The counter compare circuit 622 compares the value of the write counter 614 with the value of the read counter 618 to provide various information.

First, a difference in the read and write counter values in read counter 618 and write counter 614 respectively indicates that at least some data is present in the S-P PCI buffer 612. An analogous write and read counter set is used in connection with the P-S PCI buffer 604, and recognizing a difference in the read and write counter values would indicate that a command is present in the P-S PCI buffer 604. Similarly, where data is returned to the S-P PCI buffer 612, a difference in read and write values indicates that at least one data segment has been provided in response to the data request from the originating device on the initiator bus 600. A difference in read and write values indicates non-equal address pointer values, thereby indicating the presence of buffer information. The counter compare circuit 622 generates a "buffer busy" signal upon recognizing the presence of buffer information, whether it be a command or returned data. If there is no information in the S-P PCI buffer 612, the write counter 614 and the read counter 618 both point to the same address in the S-P PCI buffer 612.

The counter compare circuit 622 also determines whether the buffer 612 is full. If the buffer 612 fills, it may be necessary to initiate a shutdown procedure. In one embodiment of the invention, the initiating bus senses that there is information for transfer in the S-P PCI buffer 612 by using the counter compare circuit 622. The buffer size for the S-P PCI buffer 612 is 32 data segments (e.g., words), where an indication of a "full" buffer is provided when 28 of the 32 buffer locations have been filled. In this embodiment, a Ram_stop signal is activated when the write counter 614 has advanced 28 locations past the read counter 618. Activation of the Ram_stop signal forces a closure of the current PCI bus cycle by causing a Stop signal to be asserted. The Stop signal triggers a disconnect for current transfers, and forces a retry for any new requests while the counter has a value of 28 or more. As will be appreciated by those skilled in the art, buffers of different sizes may be implemented without departing from the scope and spirit of the invention. The programmable configuration register 624 allows the bridge to be configured using storage registers in the configuration space. As was described in connection with FIG. 11, a memory read line command may be used to get a burst of memory data of a size corresponding to a cache line size. The configuration register 624 includes, among other things, a register location for storing the cache line size selected. This allows a read-ahead of a block of data as specified by the cache line size register.

Referring now to FIG. 15, an example of a cache line size register 700 of the configuration register 624 is provided. The cache line register 700 illustrated includes eight bits for storing a cache line size. The cache line register 700 is used when prefetching during memory read line commands and memory read multiple commands. It is also used when prefetching during a retried burst transaction, as will be described in greater detail in connection with FIG. 16.

FIG. 16 illustrates a control register 710 which includes the retried burst read translation locations 712. Where a request for a burst memory read is retried, the retry of the memory read will occur in a concurrent mode so that only the initial double word is transferred. Since the initializing master on the opposite side of the bridge is requesting more than one double word, the transaction can be optimized by having the retry read more than one double word. This field allows either no optimization, a conservative optimization, or an aggressive optimization to occur by not bursting, bursting to a cacheline boundary, or bursting until the bridge's buffer is full. These three conditions can be coded into the two-bit retried burst read translation locations 712.

Other embodiments of the invention will be apparent to those skilled in the art from consideration of the specification and practice of the invention disclosed herein. It is intended that these embodiments be considered as exemplary only, with a true scope and spirit of the invention being indicated by the following claims.

What is claimed is:

1. A method for transferring stored data blocks having a plurality of data segments from a target bus to an initiating bus, the method comprising:

provided a memory block read command at the initiating bus to the target bus, wherein the memory block read command includes a starting address of a desired data block;

repeatedly transferring successive data segments beginning at the starting address of the desired data block from the target bus into a data buffer coupled between the initiating and target buses, in response to the memory block read command;

concurrently transferring the data segments from the data buffer to the initiating bus while transferring successive data segments from the target bus into the data buffer;

determining whether the command response is next in the queue by comparing a tag identifier associated with the memory block read command with a response tag identifier associated with the command response;

terminating the transfer of data segments from the target bus to the data buffer upon receipt of the desired data block at the initiating bus; and discarding read-ahead data remaining in the data buffer.

2. The method as in claim 1, further comprising:

determining whether the memory block read command is in a delayed completion state;

determining whether a command response corresponding to the memory block read command and the desired data block are available; and wherein concurrently transferring the data segments and the successive data segments is effected when the memory block read command is not in a delayed completion state and the command response and the desired data block are available.

3. The method as in claim 2, wherein determining whether the command response and the desired data block are available comprises determining whether the command response is next in a queue within the data buffer.

4. The method as in claim 2, wherein determining whether the command response is next in the queue comprises identifying the command response as next in the queue when the tag identifier matches the response tag identifier.

5. The method of claim 1, wherein providing a memory block read command comprises issuing the memory block read command to a command buffer, and providing the memory block read command from the command buffer to the target bus in a first-in-first-out manner.

6. The method of claim 1, further comprising monitoring the data buffer for available buffer locations by comparing a read data buffer count to a write data buffer count to determine the occupancy level of the data buffer.

7. The method of claim 6, further comprising terminating the transfer of the data segments by sending a termination signal to the target bus upon detecting a predetermined occupancy level of the data buffer.

8. The method of claim 6, wherein comparing comprises:
   a) adjusting the write data buffer count each time another of the data words enters the data buffer from the target device;
   b) adjusting the read data buffer count each time another of the data words is transferred from the data buffer to the originating device; and
   c) determining a count difference between the write data buffer count and the read data buffer count to determine the occupancy level of the data buffer.

9. The method of claim 8, wherein adjusting the write and read data buffer counts comprises incrementing a write counter and a read counter respectively.

10. The method of claim 1, further comprising providing memory read commands from the initiating bus to the target bus to read a predetermined number of data words.

11. The method of claim 1, further comprising providing memory read cache line commands from the initiating bus to the target bus to read a number of data words corresponding to a cache line size.

12. The method of claim 1, further comprising retrying repeating a read command when the target device indicates that it will not be able to respond.

13. The method of claim 1, wherein providing a memory block read command comprises issuing the memory block read command to a command buffer, and providing the memory block read command to the target bus in a first-in-first-out manner.

14. The method of claim 13, further comprising repeating the memory block read command by transferring the command from a stored delayed completion register to the command buffer.

15. A system for transferring information between an initiating device coupled to an initiating bus and a target device coupled to a target bus, comprising:

a command buffer coupled between the initiating and target buses to queue memory block read commands issued by the initiating device;

a response buffer coupled between the initiating and target buses to queue responses to the memory block read commands, wherein the responses include the information requested by the initiating device; and a comparator coupled to the command buffer and the response buffer to enable the information to be transferred between the target bus and the initiating bus via the response buffer upon determining by comparison that a command response at the top of the response buffer queue corresponds to the memory block read command which is live in the command buffer, wherein the memory block read command and the response to the memory block read command each include an identification field, and wherein the comparator determines that the command response at the top of the response buffer queue corresponds to the memory block read command by comparing the identification fields.

16. The system as in claim 15, wherein the initiating and target buses are Peripheral Component Interface (PCI) buses.

* * * * *